(12) United States Patent
Tandler et al.

(10) Patent No.: US 11,561,026 B1
(45) Date of Patent: Jan. 24, 2023

(54) THERMAL TRANSFER DEVICE FOR COVERS

(71) Applicant: SPA COVER PRODUCTS, LLC, Melville, NY (US)

(72) Inventors: John Joseph Tandler, Arvada, CO (US); Christopher Michael Pearson, Boulder, CO (US)

( * ) Notice: Subject to any disclaimer, the term of this patent is extended or adjusted under 35 U.S.C. 154(b) by 732 days.

(21) Appl. No.: 16/197,089

(22) Filed: Nov. 20, 2018

Related U.S. Application Data

(63) Continuation-in-part of application No. 15/704,864, filed on Sep. 14, 2017, now abandoned.

(60) Provisional application No. 62/589,375, filed on Nov. 21, 2017.

(51) Int. Cl.
| | |
|---|---|
| *F24S 10/17* | (2018.01) |
| *H02S 40/44* | (2014.01) |
| *E04H 4/12* | (2006.01) |
| *E04H 4/08* | (2006.01) |
| *F24S 20/00* | (2018.01) |

(52) U.S. Cl.
CPC .............. *F24S 10/17* (2018.05); *E04H 4/082* (2013.01); *E04H 4/129* (2013.01); *F24S 20/02* (2018.05); *H02S 40/44* (2014.12)

(58) Field of Classification Search
CPC ........... F24S 10/02; F24S 10/17; H02S 40/44; E04H 4/082; E04H 4/129
USPC .......................................... 126/561, 565–566
See application file for complete search history.

(56) References Cited

U.S. PATENT DOCUMENTS

| | | | |
|---|---|---|---|
| 3,072,920 A | 1/1963 | Yellott | |
| 4,082,080 A | 4/1978 | Pittinger | |
| 4,103,368 A | 8/1978 | Lockshaw | |
| 4,203,425 A * | 5/1980 | Clark | F24S 30/452 |
| | | | 126/625 |
| 4,224,928 A | 9/1980 | Werner | |
| 4,270,232 A | 6/1981 | Ballew | |
| 4,287,883 A | 9/1981 | Kyrias | |
| 4,660,545 A | 4/1987 | Ely | |
| 4,823,771 A | 4/1989 | Menning | |
| 5,156,113 A * | 10/1992 | Sextro | A01K 7/027 |
| | | | 119/61.52 |
| 5,206,819 A * | 4/1993 | Illing | F24D 19/1042 |
| | | | 700/276 |
| 5,511,536 A | 4/1996 | Bussey, Jr. | |
| 6,317,902 B2 | 11/2001 | Handwerker | |
| 6,637,046 B2 | 10/2003 | Bartlett | |
| 7,793,652 B1* | 9/2010 | Delgado | F24S 20/02 |
| | | | 126/565 |
| 7,859,813 B2 | 12/2010 | Cline | |
| 8,096,294 B1 | 1/2012 | Jenkins | |
| 8,813,275 B2 | 8/2014 | Genova | |
| 2010/0199969 A1* | 8/2010 | Chan | F24S 10/10 |
| | | | 126/561 |
| 2011/0155122 A1* | 6/2011 | Piotrowski | F24S 25/13 |
| | | | 126/625 |
| 2016/0123026 A1 | 5/2016 | Genova | |

\* cited by examiner

*Primary Examiner* — Vivek K Shirsat
(74) *Attorney, Agent, or Firm* — Reilly Intellectual Property Law Firm

(57) ABSTRACT

The solar thermal collection and radiant heating system for a spa comprising upper and lower absorber members having fluid passageways and in thermal communication, a skin member encasing said upper and lower absorber members and an insulative member located therebetween the upper and lower members and a solar collection device located on the skin member.

19 Claims, 21 Drawing Sheets

THERMAL TRANSFER DEVICE FOR COVERS

FIELD

The present device relates to a solar-heated device that heats the water in a tank or basin of water, such as a spa, pool or aquaculture tank. More particularly, it refers to a thermally active spa cover that is capable of effecting controlled movement of heat between the spa and its environment.

BACKGROUND

A spa (or hot tub) is a small pool kept at an elevated temperature intended for recreational or therapeutic purposes. A typical spa is located outdoors and is heated to about 100 degrees F. throughout the year, which uses a significant amount of energy. The majority of spas are heated with electric resistance heaters, which is typically the most expensive form of energy for heating; consequently, the cost of heating a spa is significant and methods to reduce that heat requirement using free solar energy are of interest. Furthermore, in areas that have electric utility rates that vary by time of day and which charge more for electricity during the summer and during daytime and early evening periods, it is of further interest to shift any electrical heating load to nighttime periods, especially in the summer.

The several techniques that are available for solar heating of outdoor pools could work in principle but are not suitable for adaptation to spas for several reasons. First, since hot tubs are at a higher temperature than pools, a far greater amount of insulating value is required for a hot tub cover than a pool cover, and since the required energy per unit area is greater, the collection efficiency must also be higher. Further, solar pool heater covers are typically designed to inhibit radiant heat exchange between the pool water and cover. As is described below, radiant exchange between the cover and the water can be a very useful and important means of getting heat into the spa water.

In a typical spa, a thermostatically controlled pump draws water out of the basin, through a heating element which raises the temperature of the water, which is then delivered back to the basin. These heating systems are custom designed for the particular spa and they may or may not be able to tolerate any additional components such as a heat exchanger in the fluid circuit. Therefore, retrofitting any kind of solar heater onto a spa that augments the existing heating method in the same fluid circuit requires engineering design and can possibly reduce reliability. A spa heater that does not need to integrate with the existing spa's fluid system would be an advantage from this standpoint. Furthermore, a piping system which parallels the spa's own heating fluid loop that would draw water out of the tub or would be inserted in the tub to transfer heat to the water has the potential to contaminate the water in the spa, or the water in the spa could foul the piping or heat exchange components, or the water in the pipe could freeze in winter.

Typical spa covers are made of an expanded polystyrene (EPS) board wrapped in plastic sheeting and further encased in a vinyl or fabric skin. EPS used as the structural and insulating function provides an initially lightweight and low-cost cover but the material has several disadvantages which waste energy and shorten the life of the cover. The bottom of the cover is continuously exposed to hot moist air from the spa water for many years, and the finite permeability of the plastic wrap allows moisture to reach the bottom surface of the EPS and become absorbed therein. The moisture when absorbed has three main deleterious effects. First, the moisture adds significant weight to the cover, making it difficult to remove and handle.

Second, the water reduces the insulating value of the EPS material, causing more heat loss from the spa. Third, since the moisture is absorbed primarily on the bottom side of the EPS instead of the top, and the water causes expansion of the EPS material, the bottom surface of the EPS expands relative to the top, and the cover curls upwards at the edges, causing water to pool on the surface of the cover and exposing gaps in the seal of the cover around the perimeter of the spa. These gaps allow ambient air to infiltrate into the spa volume, especially in windy conditions, causing more heat loss. Other shortcomings of EPS spa covers are the susceptibility to pock marks due to hail damage and the odor of mildew and mold growth on the waterlogged cores.

Further, while the primary purpose of the spa cover is to thermally insulate the spa water from the environment, there are many times when it is advantageous for the cover to exchange thermal energy with the environment. First, the top of the spa cover receives a great deal of incident solar energy which could be profitably transferred to the spa water in the majority of situations. Second, in hot climates many spas can become overheated; that is, the ambient air combined with incident solar energy bring the equilibrium water temperature above the desired setpoint temperature for the user. The only practical means available to the spa owner to cool the spa is to prop open the cover or open it entirely.

However, this uncontrolled means of cooling often runs the electric heater unnecessarily when the water cools back down. A controlled means of automatically evacuating heat from the spa through the cover to the environment would allow the temperature to be regulated more evenly with minimal heating required when the ambient temperature dropped again. Third, snow accumulation on the top of the cover becomes a nuisance in many cold climates, with the chore of cleaning the snow off the top of the cover being beyond the physical ability of many elderly, infirm or young spa users. Further, the buildup of deep snow can become a severe structural load on the cover, often causing structural failure and collapse. An ability to use the heat of the spa to melt the snow before it accumulates is therefore a very desired feature. Therefore a need exists for a spa cover that presents none of the water absorption issues of EPS while providing a durable surface impervious to hail damage and providing a means for air circulation that enables thermal exchange with the environment.

Spas are often located prominently on patio or decks and are designed to be as aesthetically pleasing as possible. Solar water heating solutions that require a solar heating panel and piping that are external to the spa or cover would only detract from the particular look that the manufacturer designed for the unit, and so a spa heater that completely conforms to the existing form factor of the spa and cover, and which changed the outside appearance as little as possible, would be desirable. Hot tubs are typically equipped with a rigid or flexible removable cover that physically isolates the water from the environment and serves to thermally insulate the water from the outside air. This cover also receives the majority of the solar radiation that is incident on the spa, so the cover is an advantageous place to locate the solar heater. However, aspects of the cover make it difficult to adapt standard solar thermal and photovoltaic technology to a heater located in the cover. First, typical solar thermal collectors made of glass and copper are far heavier per square foot than the cover itself, and the added weight would make the cover very difficult to remove for use of the spa, not to mention the incompatibility of glass in a swimming environment. Furthermore, even if lightweight materials are used, the use of water or other comparably dense liquid as the working fluid adds a significant amount of weight. Second, solar photovoltaic panels have energy conversion efficiencies typically less than 20 percent, and with the fixed amount of surface area available on the cover, they would not be able to collect enough energy to be cost effective. Therefore, an effective cover needs to be both thermally efficient and lightweight.

Spa owners generally prefer to control the spa to a fairly tight range of temperatures, typically within just a few degrees of the setpoint. Any spa heater that is capable of elevating the temperature of the water must be capable of being turned on and off, so that the preferred upper temperature is not exceeded. Furthermore, very high-water temperature levels are a potential scalding hazard, so the temperature controls need to be fail safe. That is, the failure of any one component must serve to stop or slow the heating of the water, as opposed to resulting in runaway heating that could cause injury. Finally, with many types of thermal appliances such as water heater or ovens, it is difficult for the owner of the device to have an estimate of how much electricity it consumes. Actual usage depends on the time the device's heater is on, and so energy use must be integrated over time which requires some computing facility. More simply, it is difficult to see if the device is actually working since it the typical person is not able to measure the temperature of surfaces or liquids with any degree of accuracy. This is especially true of a spa heater with the heating element out of sight, so it would be advantageous to inform the user of its proper functioning, and especially if it could provide an estimate of the amount of heating energy that has been provided over a period of time. This would increase enable diagnostics and improve customer satisfaction.

SUMMARY

One form of cover utilizes a vinyl or fabric skin that encases the entire exterior surface of the cover which provides the desired outer color and appearance, plus protection from the environment such as ultraviolet light, rain and debris; attachment points to the spa; and a living hinge down the center. Encased inside the fabric skin on one or both sides of the cover are thermal exchange modules that fill up to the entire volume inside the skin. The outer layer of the thermal exchange module is a sealed shell formed of twinwall plastic such as polycarbonate. The twinwall plastic is preferably about 6-8 mm thick and it provides a near total seal against moisture intrusion from the top and bottom. The twinwall configuration of the extruded plastic greatly increases the stiffness of the sheet relative to a solid sheet of the same weight. Further, if polycarbonate is used for the material, the high impact resistance offered by polycarbonate is sufficient to survive large hail stones with no penetration or pock marking.

The twinwall is folded into a shell in such a way as to provide continuous air passages from the shell material on the top of the cover to the material on the bottom of the cover in a manner to be described. Fans can be placed inside the polycarbonate shell to circulate air inside the cover so that the top and bottom of the cover are in fluid communication with each other. Since the top of the cover is in thermal communication with the environment and the bottom of the cover is in thermal communication with the spa water, the flow of air around the perimeter of the heater allows the spa to exchange heat with its environment in both directions.

The interior cavity of the twinwall shell houses a volume of thermal insulation. Since the upper and lower sheets of twinwall polycarbonate provide adequate stiffness to handle the environmental loads such as snow, wind and people standing on the cover, the insulation itself need not have any structural qualities of its own, as does the EPS in the standard spa cover. This allows the insulation to be formed by polyurethane spray foam or thin sheets of rigid foam insulation such as polyisocyanurate which is faced with foil to allow insulating air cavities to be formed. The foil faced sheets provide air cavities that are bounded by reflective surfaces providing significant insulation with very low weight, which is highly desirable for a spa cover.

BRIEF DESCRIPTION OF THE DRAWINGS

The present forms may be better understood, along with its numerous objects, features, and advantages made apparent to those skilled in the art by referencing the accompanying drawings.

DETAILED DESCRIPTION

Figure 1:
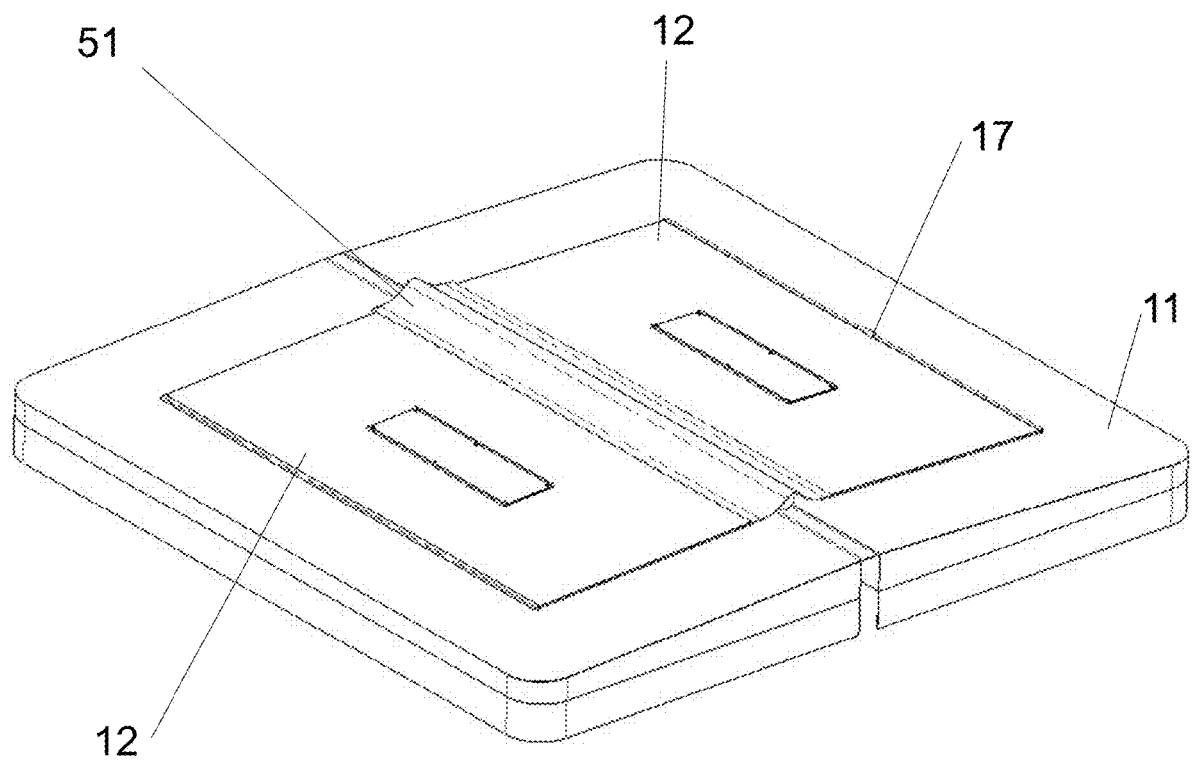
FIG. 1 illustrates a perspective view of the top view of the entire assembly installed in a standard cover.
Figure 2:
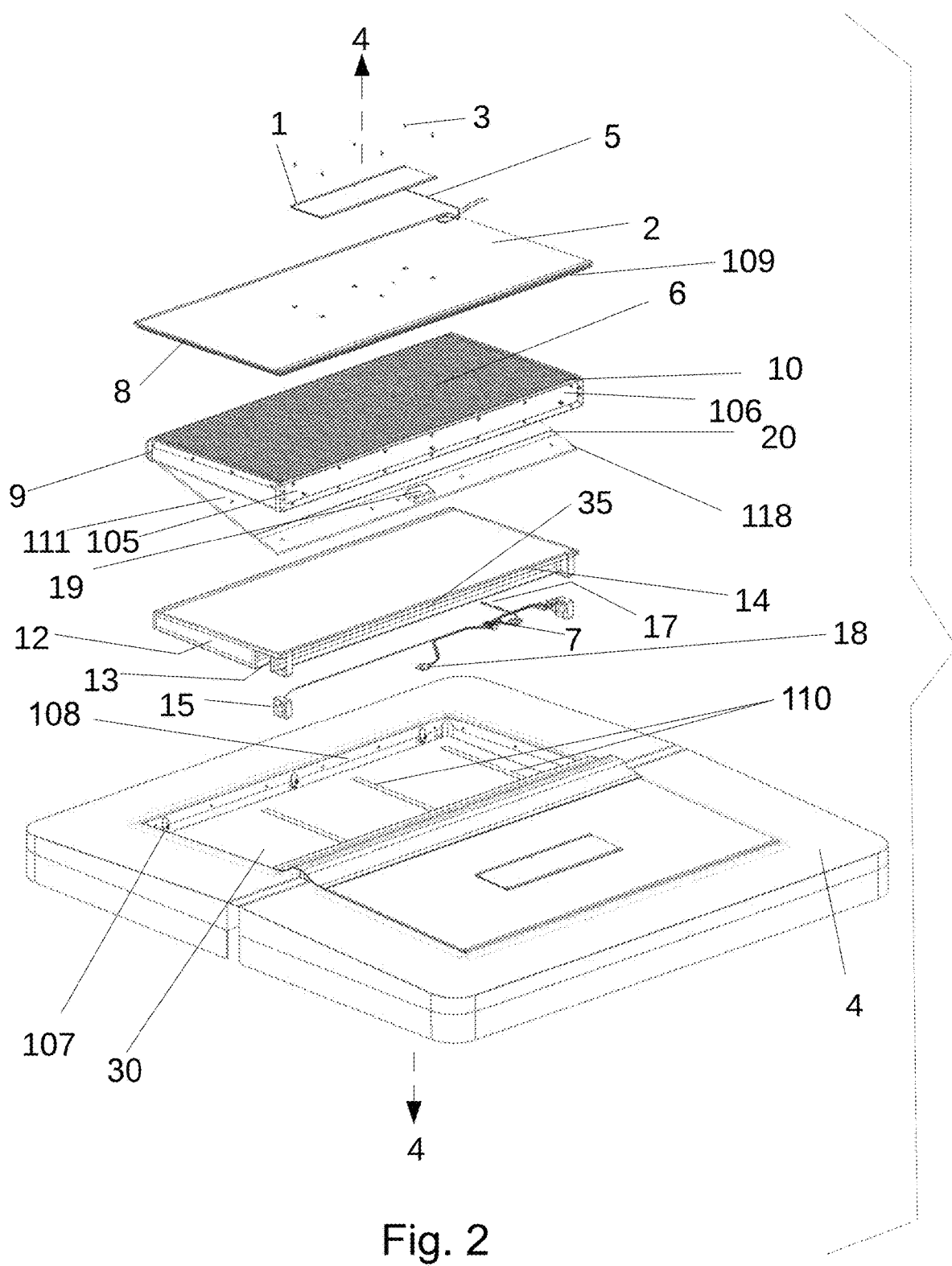
FIG. 2 illustrates an exploded view of FIG. 1.
Figure 3:
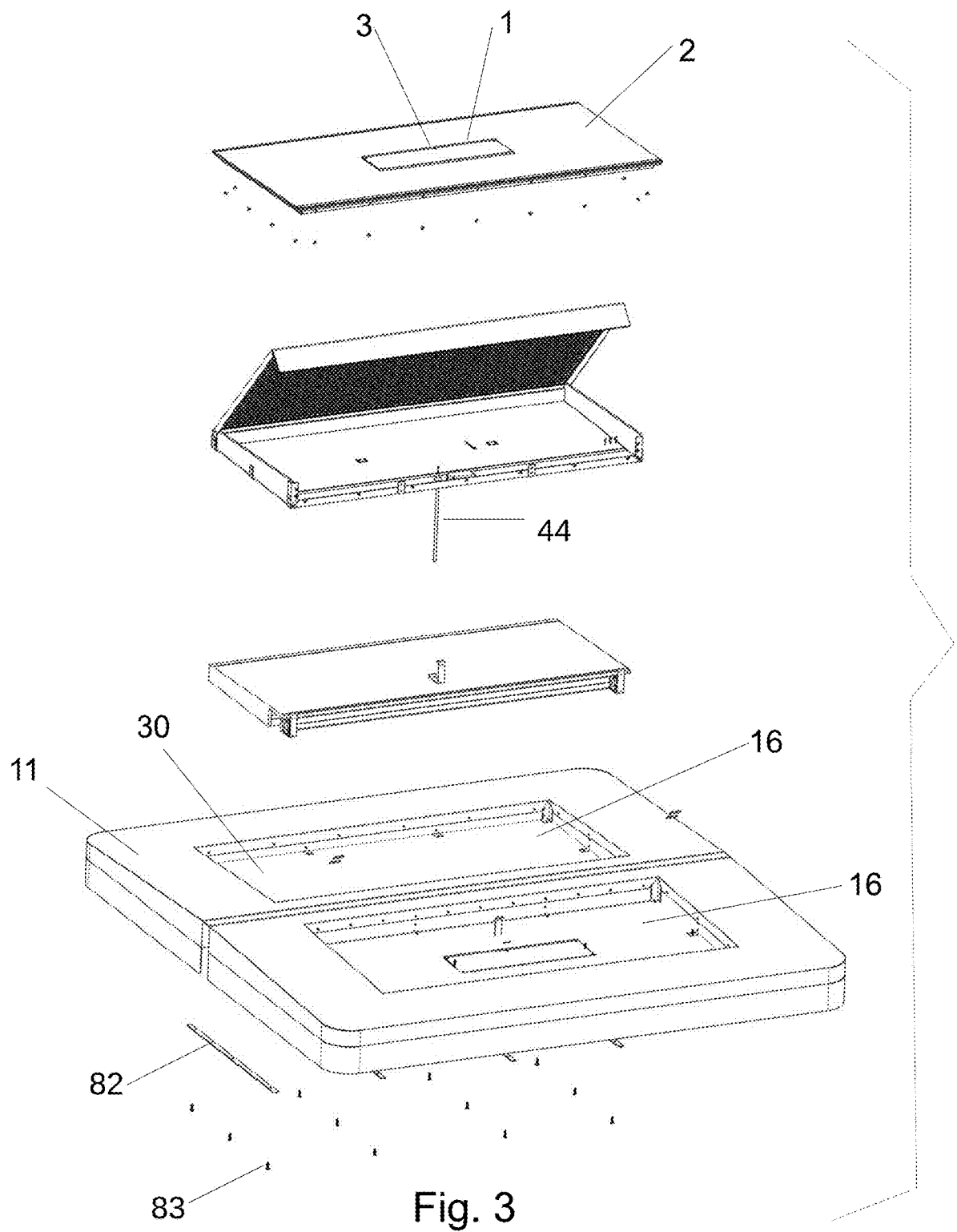
FIG. 3 illustrates an exploded view of an alternate form.

The following, as shown in FIGS. 1-17, illustrates a combination of solar thermal technology and solar electric technology in a spa or swimming pool cover to provide for improved solar thermal collection and passive heat transfer. Incident solar energy on the top of the cover heats a polycarbonate solar absorber. More specifically, FIGS. 1-3 show a spa cover 11 with at least one self-contained solar heating element 12 inserted within openings 16 in the cover 11. The forms shown in FIGS. 1-4 as well as FIGS. 11-17 show another form which will be described in more detail. Generally, spa covers are made from sheets of rigid insulation board such as polystyrene that are covered in heavy duty vinyl that is sealed to keep moisture out of the cover and the spa. The top of the cover is typically covered with vinyl or waterproof plastic coating that matches the color of the spa body and the surrounding area, and the bottom is covered with white or grey vinyl or other forms of plastic coating. Typically, the cover is formed in two rigid sections, with a living hinge down the center, allowing the user to fold the cover in half for ease of installation and removal.

FIG. 2 illustrates an exploded view of the entire assembly showing the major elements of the heater as installed in a standard cover. The small solar PV panel 1 is attached to the glazing 2 using a combination of mechanical fasteners such as a push-in plastic rivet 3, and a waterproof adhesive such as silicone or urethane caulk. The wire leads 5 coming from the PV panel 1 are fed through a small hole in the glazing 2 and then through a hole (not shown) in the top face of the absorber 6. From there, the leads are fed through the middle of the absorber panel, exiting in the supply duct in the vicinity of the wiring terminal strip 7. A set of four brackets 8 are fastened to the perimeter of the glazing 2 which allow the glazing to be fastened to an air loop 9, which will be discussed later in further detail, using simple mechanical fasteners such as screws or rivets. The air loop 9 is formed from a single sheet of twinwall polycarbonate that is partially cut and folded in a manner to be described. The majority of the edge joints 10 that are needed to be made when the air loop is assembled are made with permanent plastic-to-plastic adhesive such as solvent welding or ultraviolet curing acrylic adhesives. Three of the edge joints 118 on the bottom side of the air loop 9 are made with removable techniques such as brackets attached with mechanical fasteners or removable tape. This allows the bottom of the air loop to be easily opened as an access door easing both initial assembly and maintenance.

The subassembly that fits inside the air loop 9 is called the core 12. The core provides passive thermal insulation as well as the structure for the return 13 and supply air ducts 14 and the mounting place for much of the electronics wiring terminal block 7. The core also houses preferably two axial fans 15 which are at the interface between the return duct 13 and the supply duct 14. The core 12 is made of rigid insulation such as polyisocyanurate or fiberglass boards which are lightweight and have good insulating properties and also can withstand the peak temperatures of 250 F. The indicator LEDs 35 are embedded in the top sheet of the rigid insulation where they can be seen from outside looking through the absorber and glazing 2.

The core 12 is inserted into the open door in the air loop and three electrical installation steps are made. First, the PV electrical leads 5 are connected to the terminal block 7. Next, bimetallic switch 17 is inserted into one of the internal air passages of the absorber. Finally, the digital thermostat board 18 is fastened to the bottom sheet of the air loop and a small plastic enclosure 19 is installed over the board to insulate the board from the hot circulating air. After these are installed the access door 20 is sealed by means of a closing bracket with mechanical fasteners or removable tape. Finally, small brackets (not shown) are fastened at roughly equal spacing around the lower perimeter of the air loop to allow for fastening to the spa cover brackets. This complete unit then forms one heater assembly, which is comprised of a glazing member 2, an absorber 6 and radiator 4 having an air loop 9, the core 12, and the mounting brackets.

Generally, two large openings 16 are cut through the cover 11, leaving the bottom layer 30 of vinyl in place. One opening is cut on each of the mirror-image halves and the two identical, mirror-image solar spa heater element(s) 12 are inserted into the openings 16 so that the top side of the heating element 12 faces the open air and, more importantly, the sun, and the bottom side of the heating element is directly above and touching the bottom vinyl layer 30. The outer, upper edge of the heating element is sealed or caulked where it meets the opening 16 so that the watertight integrity of the cover is not compromised. A rubber gasket may also be used to create a water-tight seal with the solar element 12. FIG. 1 and FIG. 2 demonstrate that the opening(s) in the cover 11 only occupy the center portion, leaving a significant area of unmodified cover around the outer perimeter of the tank so that the thermally active portion of the cover is not in close proximity to the edge of the spa, where it might cause overheating and damage to the rim of the tub or other knobs and components. Leaving the outer area of the cover unchanged has other advantages. First, since the plastic from which the solar heating panel is formed is fairly rigid, it would not form a good air- or vapor seal if laid directly over the rim of the spa, and so a foam gasket or other sealing device would be required, which adds expense. Second, the existing tie-downs that hold the cover in place can be used. Finally, the vinyl that covers the typical spa cover comes in many colors and that is typically matched to the color of the spa body would be unchanged so the visual appearance would be more similar.

The form that is shown in FIG. 2 uses a cable latch system by which each heater is installed into the base cover by simply placing the cover into the opening in the base cover and pressing down to engage a set of latches which hold the cover down securely. The self-contained nature of the heater allows for easy installation and removal of the unit. The heater may be removed by pulling on a cable which disengages the latches and allows the heater to be lifted directly out of the cover with no tools or equipment required. At least four but preferably six metal pins 105 are installed on the two longer vertical faces 106 of the heater. At least four but preferably six corresponding latches 107 are also installed on the vertical faces of the perimeter channels 108. These latches use a spring return mechanism to provide a positive capture of the pins as the heater is lowered vertically into the opening in the cover. The heater is placed in the opening, then a moderate force is applied to the glazing 2 near the latch. A glazing gasket 109 is then compressed enough to engage the latch 107 in a manner similar to closing a car trunk. The latches can then be disengaged using a wire cable that rotates the latch plates, freeing the pins and allowing the heater to be removed directly.

FIG. 2 also shows the embodiment of the stays which hold the underside vinyl in close proximity to the radiator to minimize temperature differences and improve the radiant heat transfer. Preferably but not by limitation, a set of stays 110 are affixed to the upper side of the lower layer of vinyl 30 of the base cover. The stays are made of thin strips of magnetic sheet metal material, and are held to the fabric using tape or sewn pockets. To hold the stays tightly to the bottom of the air loop, a set of small high strength magnets 111, for example neodymium, are embedded in some of the air passages of the radiator 4 at points that align with the stays 110. When the heater is installed in the opening in the cover, the magnets 111 are brought in close proximity to the metal strips, and the stays 110 are held to the radiator by magnetic force without need of fasteners or any external feature that can be viewed from the outside. The present form leaves the entire lower layer of vinyl that exists on the bottom of the base cover in place. The space between the radiating surface of the heater and the lower layer of vinyl is reduced to near zero using a set of steel stays embedded the lower vinyl sheet and high strength magnets embedded in the air passages of the radiator.

Figure 4:
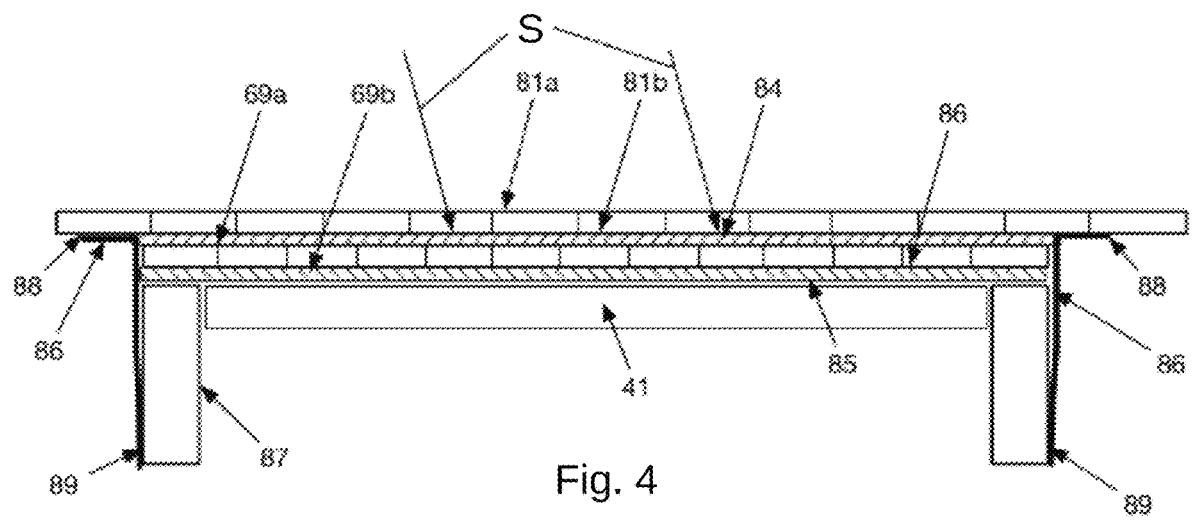
FIG. 4 illustrates a cross-sectional view about lines 4-4 of FIG. 2.
Figure 4A:
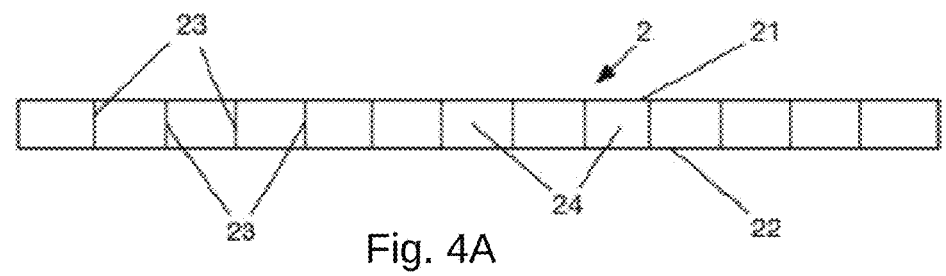
FIG. 4A illustrates an enlarged view of FIG. 4.

FIG. 3 shows additional details of one of the solar heating elements along with a secondary form of attachment to the spa cover. The top of the heater is covered with the clear plastic glazing 2, preferably polycarbonate which has been extruded in the form of twinwall hollow sheets. Multi-wall polycarbonate sheets may be used without departing from the scope. Sheets of extruded twinwall plastic are utilized as thermally active surfaces, in which the working fluid flows through the sheet itself. This provides very efficient heat exchange between the fluid and the surface of the sheet, while the twinwall configuration also provides high bending stiffness and low weight. The glazing covers the top of the solar heater element, and wraps around the edges to form the part of the heater that touches the edge of the opening 16. The glazing 2 is transparent so that it serves to allow incident sunlight to pass through the glazing 2 to the absorber 6 below while also limiting the heat that escapes back to the environment. Alternatively, pigments could be added to the plastic in the glazing 2 so that it is mostly transparent, but has a color which is aesthetically compatible with the rest of the cover and the spa itself. The internal structure of the twinwall is shown in FIGS. 4 and 4A, showing that two smooth facing sides 21 and 22 are connected by ribs or upright walls 23 that provide strength and rigidity. The two facing sheets and the ribs together enclose a plurality of enclosed, sealed air cavities which provide insulation against passive heat transfer from the heater to the air. These stagnant air cavities provide insulation between the internal heater elements and the ambient air, and also insulate the hot portions of the heater from the edge of the standard cover opening 16.

Figure 4B:
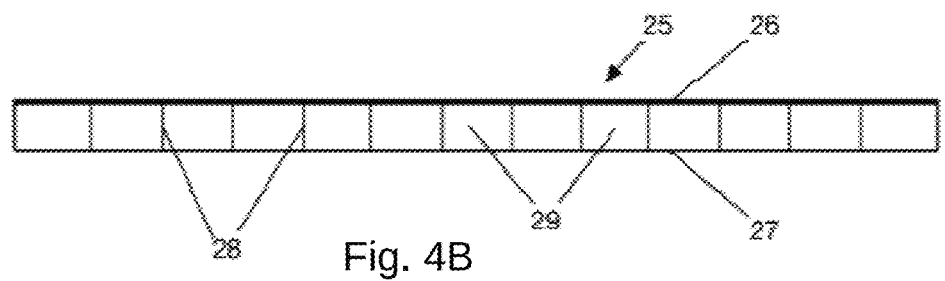
FIG. 4B illustrates an enlarged view of FIG. 4.

FIG. 4 shows the absorber and glazing. The combination is formed from a single sheet of twinwall plastic material that is cut and folded in a manner described below. FIG. 4B shows the cross-sectional view of a portion of the twinwall sheet of the absorber 6. The structure is similar to the structure of the glazing with face sheets 26 on top and 27 on the bottom, with ribs 28, and cavities 29. However, the function of each of these elements is different. The upper face sheet 26 is painted with a dark color to convert the incoming solar radiation into heat. (This is shown as a heavier line in the drawing, although the thickness of the paint is negligible). The lower face sheet 27 and the ribs 28 form air cavities which are not used strictly for insulation but which also form a plurality of fluid passages allowing both liquids and gases to flow therethrough. The ribs additionally function as heat transfer fins which conduct heat from the absorber surface 26 to the opposite face 27 to increase the heat transfer surface area from the sheet to the fluid within by approximately a factor of four compared to just the absorber surface 26.

Figure 4C:
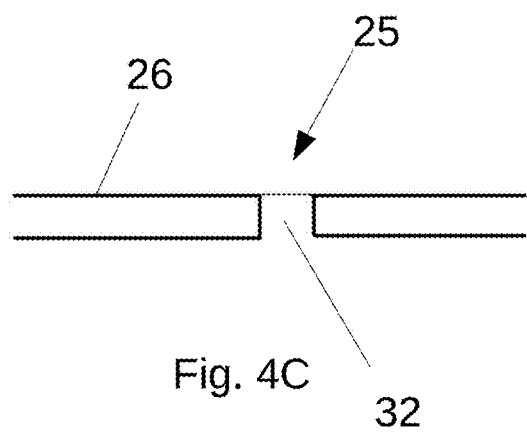
FIG. 4C illustrates a sectional view of the upper right corner of absorber/radiator element.
Figure 4D:
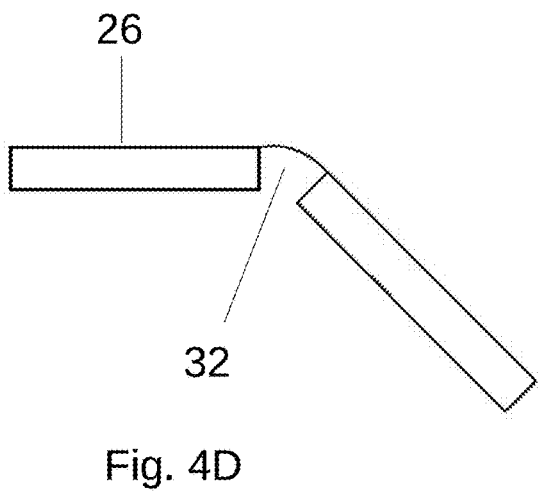
FIG. 4D illustrates a sectional view of the upper right corner of absorber/radiator element.
Figure 4E:
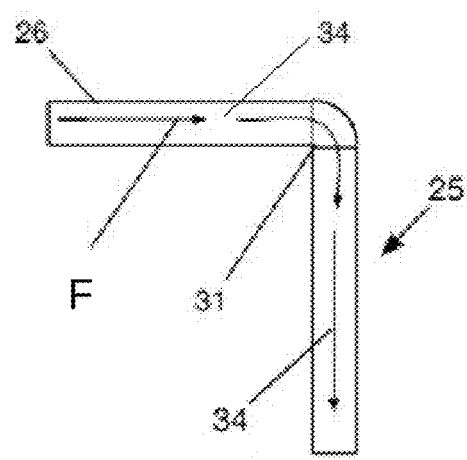
FIG. 4E illustrates a sectional view of the upper right corner of absorber/radiator element.

FIG. 4C-FIG. 4E show how the fluid passages are maintained around the corners of the sheets. In the manufacturing process, parallel grooves are cut across the inside face sheet of the absorber/radiator so that the interior face sheet and the ribs are cut away, leaving only the opposite outer face sheet and making the sheet easy to bend along the groove. The width 32 of the groove is such that when the sheet is folded into an "L" shape the inside edges of the cuts close off the cut wall 31 to form a continuous inner surface which is tight enough to pass air with minimal leakage so that a duct is formed without any adhesive or bonding operations. This provides a set of continuous fluid passages which allow a fluid F, preferably heated air, to pass unobstructed through the absorber passageway 34 and then around the first corner to go downwards, and through the radiator passageway 34'. A third bend (not shown) is then formed to return the air to the upper area under the glazing. The fan or pump 15 is used as the motive force to transport the heat in a controllable way from the absorber surface 26 to the radiator surface 38. This is also shown in the flow diagram FIG. 16.

The absorber surface 26 is directly below the glazing and may be painted a dark color, so that the sunlight that passes through the glazing 2 and strikes it is mostly converted to heat. The color could be black, which would absorb the most amount of heat; however, if the color is too dark, it can cause overheating of the collector in the summer when the fans are off. In one form, the absorber surface is painted another dark color, such as grey, blue, green, or brown, that is less absorbing of the solar rays but which also is more aesthetically compatible with the rest of the cover and the spa base. Alternatively, the upper surface 26 could be left clear, and the lower surface of the absorber sheet 27 could be painted a dark color to form the absorber. This alternate embodiment would have a higher stagnation temperature, that is, the temperature reached when the sun is shining on the absorber, but the fan is not running so that a maximum equilibrium temperature is reached. Since it is possible that this temperature could be high enough to damage the material, this alternate would be suitable for a northern or shaded location where the sun is less intense or where temperatures are cooler.

Figure 5:
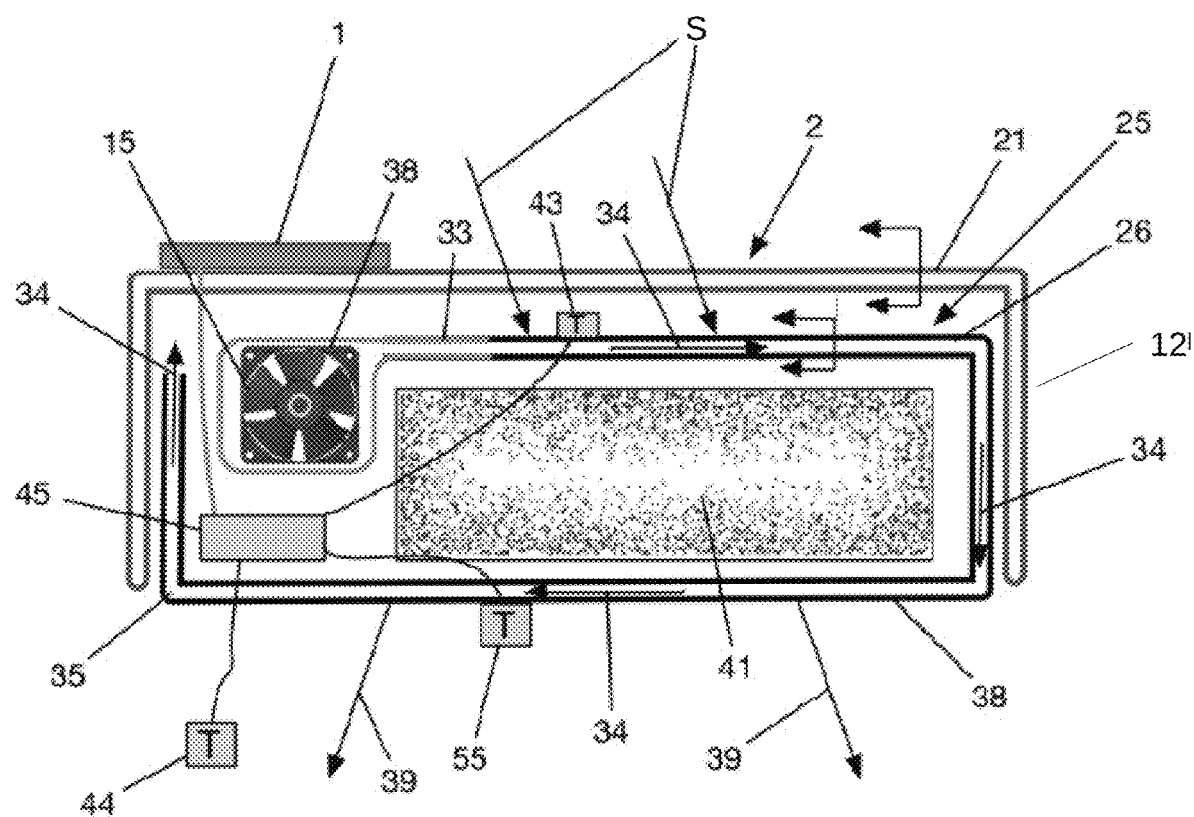
FIG. 5 illustrates an alternate form of the system shown in FIG. 2.

As shown in FIG. 5, a plastic duct 33 is bonded or welded to the open end of the absorber twinwall fluid passages which is connected to one or more fans 15 which draw air from inside the cover and pass it through the absorber, around the U turn, and then through the lower portion which is the radiator and back to the top. In this way, there is no air exchange with outside air or the air under the cover and all of the airflow is within the cover. This is important because the air underneath the cover is extremely humid due to the evaporation from the hot water, and the air outside can be very cold or dusty. The bottom side of the radiator component 38 directly faces the surface of the water 40 in the basin 56 and so serves as a thermal radiating surface 39 to heat the water 40. The clear underside of cover 38 if left exposed would provide the user with an undesirable view of the insulation board, the duct and fan, and would expose the plastic of the radiator to the water vapor in the volume between the water and the cover. Therefore the bottom layer of the vinyl wrap 30 is left in place. The twinwall configuration of the sheet allows the fluid to flow directly adjacent to the radiating surface. In a manner exactly analogous to the operation of the absorber 6, the face sheets and the ribs in the radiator form a series of hollow rectangular volumes that serve as ducts for the flow of fluid. In addition, the transverse cell walls similar to those in the absorber 6 serve as conduction fins to increase the effective heat transfer surface area between the fluid and the radiating surface.

FIG. 5 shows that the space between the absorber and the radiator is occupied by a layer of insulation 41, preferably 2-3 inches of rigid foam such as polyisocyanurate or polystyrene. Polyisocyanurate is preferred over the polystyrene which is used in most hot tub covers because it has a higher service temperature and has a higher insulation value per unit thickness. This allows the insulating board between the absorber and radiator to be thinner than the polystyrene insulation in the rest of the cover but the passive heat transfer characteristics of the cover are not reduced by adding the solar heater in the center since the insulation in the cover has a higher insulation value per unit thickness. This also provides an order of magnitude more insulation than a pool heater cover would provide.

Figure 18:
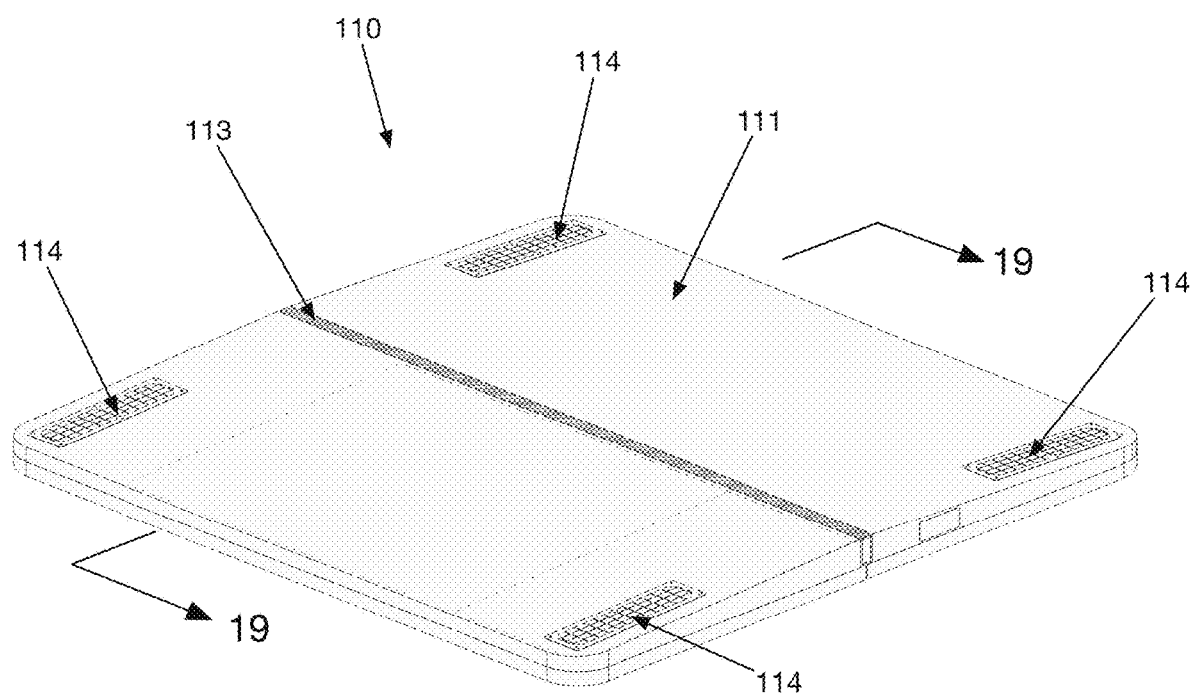
FIG. 18 is a perspective view of the entire assembly showing the two sections of the solar collector installed on a spa.

The electrical subsystem is comprised of the active power and electrical components which control the flow of the fluid between the absorber and radiator as shown in FIG. 18. The power can be either externally provided, from the hot tub itself, or from one or more small photovoltaic panels 1 mounted directly on the top of the glazing or cover to provide the electrical power for the pumping and control functions. Two temperature sensors are part of this subsystem; one 43 measures the temperature of the absorber surface, and the other 44 the temperature of the water in the tank. This second sensor 44 can be either a discrete wired sensor such as a thermocouple or thermistor that is housed in a temperature probe that drops down into the water from the underside of the heater, or a remote infrared thermopile-type sensor which requires nothing to dangle or extend from the cover body. A logic board or analog equivalent 45 reads the temperature sensor values and detects the condition when both the absorber temperature is greater than the water temperature (plus an offset), and also the water temperature is below the desired setpoint. When both of these conditions are met, the controller applies the power from the PV panels 1 to the pumps or fans 15 which drive the fluid flow from the absorber to the radiator. Alternatively, the control could be achieved with two simple analog thermostats in series, detecting if the absorber is above a set temperature of say 110 degrees F. and if the water is below an adjustable setpoint. The gas or liquid flowing past the radiating surface elevates the temperature of the radiating surface causing heat to be directed downward from the radiator 38 to the surface of the water 40. There is also some convective transfer but since the heating surface is above the water, the dominant form of heat transfer is radiant.

The control system is inherently fail-safe, in that the failure of any component of the power supply or fan/pump will result in the elimination or reduction of the heating functionality. In one form, the user interacts with the controller 45 using a wireless interface such as Bluetooth or WiFi, so that there need be no physical knobs or buttons on the outside of the cover that could be damaged or cause leaks. The fans are powered by one or more photovoltaic panels mounted on the top of the heaters 12, or on the cover itself 11. Each individual PV panel is subject to loss of power due to shadowing; when the sunlight is even partially blocked, the panel can lose most or all of its generating capacity. If two panels are used, the panels are arranged in a parallel circuit so that if one panel is shadowed, the other can still provide partial power if a blocking diode prevents reverse current.

To prepare the standard spa cover 11 for installation of the heater, the opening in the foam insulation is reinforced with structural channels 108, preferably formed of thin gauge aluminum, which provide firm attachment points for the brackets on the heater, and also serve to insulate the foam (typically styrofoam) from the high temperature of the heater. The heater assembly is lowered into the opening and screws 83 are driven upward to secure the heater in the opening and to preload the glazing gasket 109. The same screws 83 are used to secure a set of stays 82 to the bottom of the completed cover. The stays 82 are required to maintain a small clearance between the radiator surface and the bottom vinyl sheet that faces the water in the spa. The small clearance is needed to minimize the temperature difference between the plastic radiator surface (the bottom of the air loop) and the vinyl 30 which actually radiates to the water.

Figure 17:
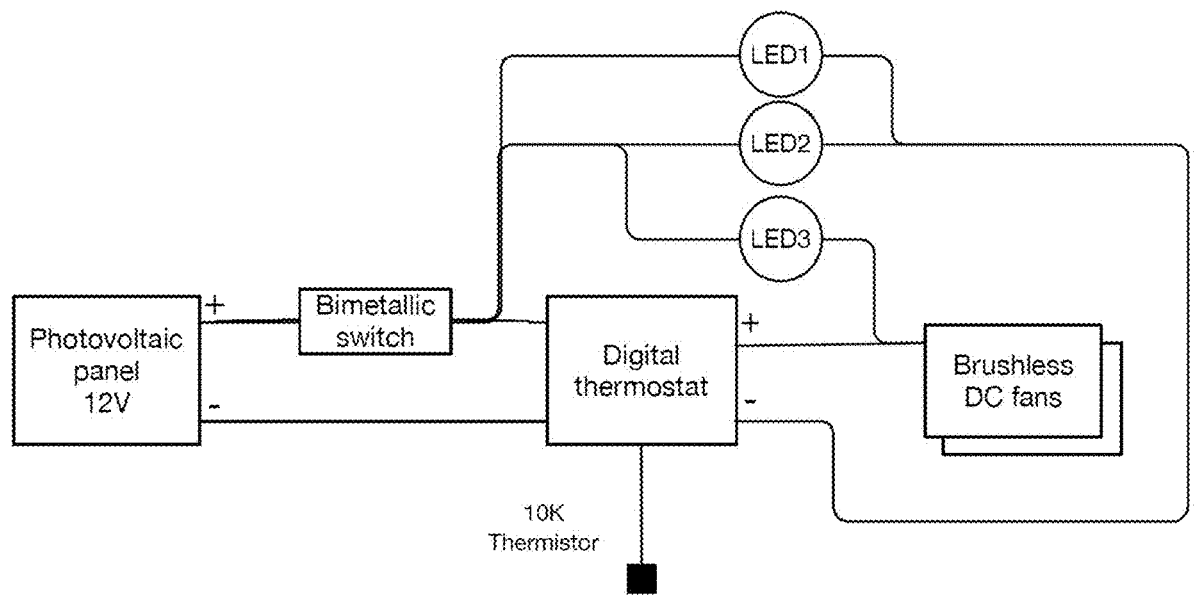
FIG. 17 is a circuit diagram.

FIG. 17 shows one embodiment of the electrical power and control system for each heater. When the sun first rises on the solar spa cover, the photovoltaic panel begins to generate a small amount of power, but not enough to power the fans or the controller. At this time, the indicator light LED1 begins to illuminate to show that the PV panel is operating properly and solar energy is available. As the sun rises further and the absorber heats to a temperature hotter than the water in the spa, it is at that time advantageous to operate the fans. The bimetallic switch which is mounted inside the absorber then closes, and power is applied to the digital thermostat. At this time, LED2 illuminates to show that the absorber is hot enough to be heating the water. If the 10 k thermistor reads below the maximum allowable temperature for the water in the spa, the thermostat relay is closed, which allows power to flow to the fans and for the heating function to proceed. At this time, LED3 is off, indicating that the heater is heating, and that the water is not at its maximum temperature. If the water in the spa reaches the maximum temperature set by the digital thermostat (typically 104 degrees F.), the thermostat breaks the circuit and stops the fans. The output of the thermostat dropping to zero causes a voltage to be applied to LED3, so LED3 illuminates, showing an observer that the water has reached its maximum temperature.

An optional 10 W, 12 V solar Photovoltaic (PV) panel on each side of the cover powers a small controller and two small DC brushless fans. A bimetallic thermostat is embedded in each solar thermal absorber. When the solar absorber is above 110 F, the bimetallic switch closes and the solar power is applied to a small digital thermostat. The digital themostat has connected to it a temperature probe 44 that drops down from the spa cover into the water in the spa. When the spa water temperature sensor reads below 104 F, power is applied to the two small axial DC fans which circulate air inside the cover. The circulated air receives heat from the thermal absorber and circulates hot air from the top of the cover to the bottom area of the inside of the cover, heating the bottom surface of the cover to about 170 F. The elevated temperature of the bottom of the cover causes the solar heat to be radiated down to the water in the spa. When the water temperature rises over 104 F, a relay in the digital thermostat opens and the operation of the fans is stopped. The solar absorber is designed so that even with the fans off, the stagnation temperature of the solar thermal absorber does not exceed the service temperature of the plastic in the absorber. There are two identical heaters, one on each side of the folding cover. If one of the digital thermostats fails and continues to run at a water temperature above 104 F, there is insufficient heat available from the one heater to raise the spa temperature above the safety limit temperature of 112 F.

Figure 6:
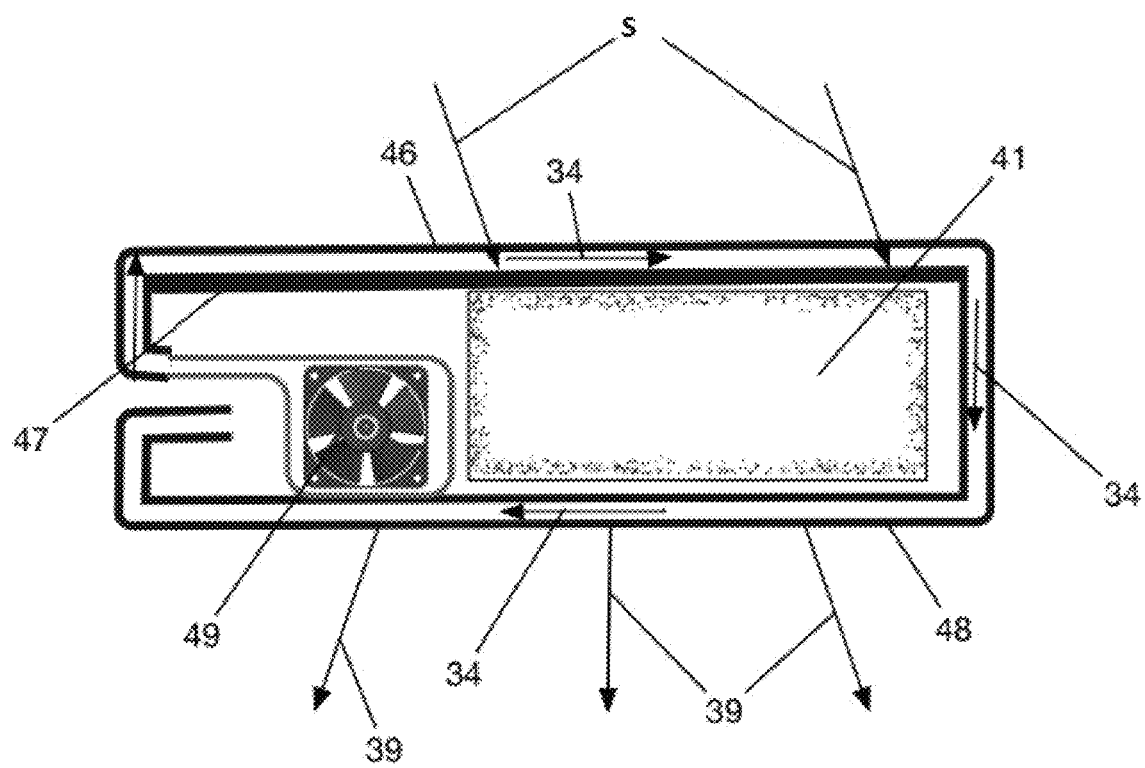
FIG. 6 illustrates a second alternate form of the system shown in FIG. 2.

FIG. 6 shows a second form, in which the function of the glazing and the absorber are combined into one element 46 by making the glazing itself the thermally absorbing sheet by forcing the airflow through the twinwall glazing itself. In this case, the bottom surface 47 of the glazing sheet would be painted the dark color. This would be less efficient because a separate glazing would not be providing an insulating function but heat could still be absorbed and transferred to the radiator 48 in warm weather and/or high sunlight. The fluid flow path would be similar to the case with the fan or pump 49 propelling the fluid that is within the cover through the top sheet where it absorbs heat, then is ducted down 34 to the bottom of the cover where it heats the radiator surface 48.

Figure 7:
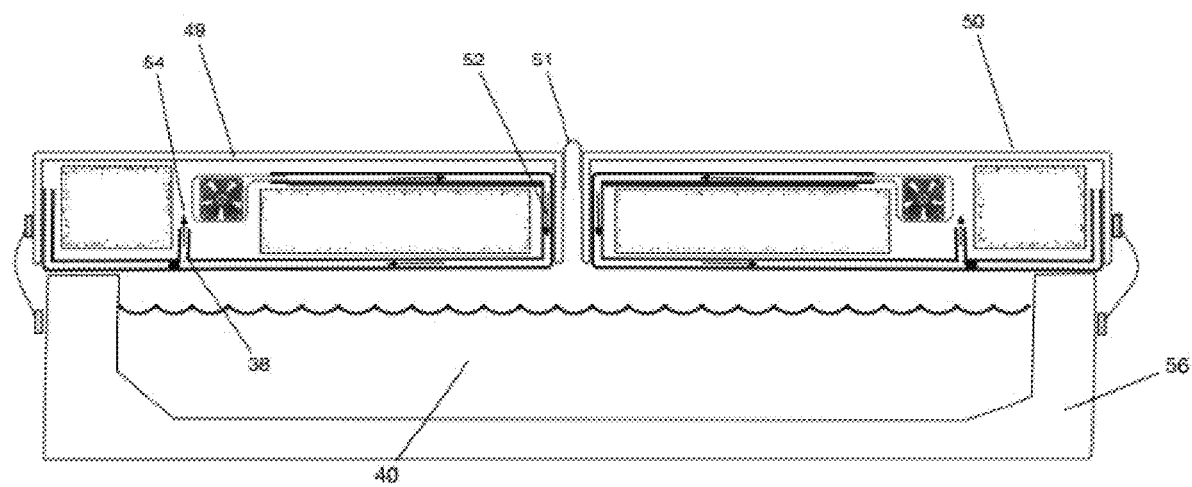
FIG. 7 illustrates the system shown in FIG. 6.

In a third embodiment, as shown in FIG. 7, the heater would not be inserted into an existing cover, but rather the entire cover would be fabricated out of twinwall polycarbonate with an active heater area in the center. In this case, the cover is made of two separate halves (49 and 50) joined in the center by a plastic sheet that acts as a living hinge 51. The airflow path is similar, but some accommodation must be made to keep the thermally active portion of the cover in the center only and maintain cool temperatures around the perimeter. The absorber/radiator has the 180 degree turnaround at the hinge in the center 52, and the air passage through the radiator is interrupted about 12 inches from the edge 53. An opening is cut to allow the air to return to the plenum in the center of the cover and return to the fan inlet 54.

Figure 8:
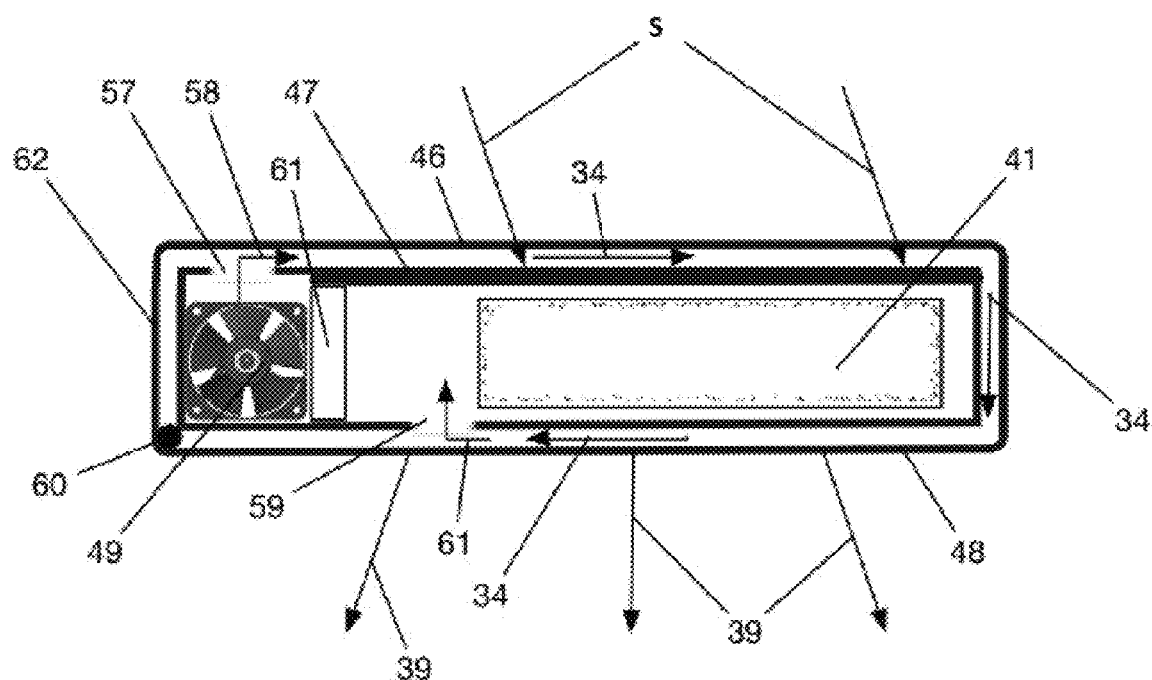
FIG. 8 illustrates a third alternate form of the system shown in FIG. 2.

In a fourth embodiment, as shown in FIG. 8, the heater is similar to the heater in FIG. 6, and is inserted into an existing cover, but the air entrance and exit passages are different. In FIG. 6, the fans blow air into a transverse duct that is formed out of a thin single sheet of polycarbonate or other lightweight plastic. This duct 33 is attached to the end of the twinwall sheet and the air enters the sheet from the end as shown in FIG. 6. In FIG. 8, the separate duct component is eliminated, and the four walls that comprise the functional air passage are formed by the end of the absorber sheet 46, the end of the radiator sheet 48, the vertical wall 62 that connects the absorber and the radiator, and a vertical wall formed of either plastic or insulation board 61. In this way, the existing components and materials form three of the four walls of the duct, and only one wall 61 need be added. The air 58 enters the side of the sheet through a slot 57 that is cut in one wall of the twinwall. This is formed by using a router bit that has a very low depth so that it cuts only one of the faces of the twinwall and none of the ribs. This allows the sheet to maintain most of its bending stiffness while allowing air to efficiently enter the sheet. Air 61 exits the radiator sheet 48 in the same way through a slot 59 that is cut in the upper side of the sheet. The air exiting the radiator sheet enters a second functional duct that is formed by the absorber sheet 46, the radiator sheet 48, the vertical barrier 61, and the edge of the existing insulation board 41. So here also, there is no need for a separate component to form the duct. In order to prevent the air from continuing through the sheet 62 back around to the absorber 46, it is necessary to block the passage of air somewhere between the exit point 59 and the entrance point 57. This is accomplished by inserting a piece of soft foam cord 60 into the fold in the twinwall before it is folded. The soft foam presses to the edges of the ribs and forces the air to flow out of the exit point 59.

Figure 9:
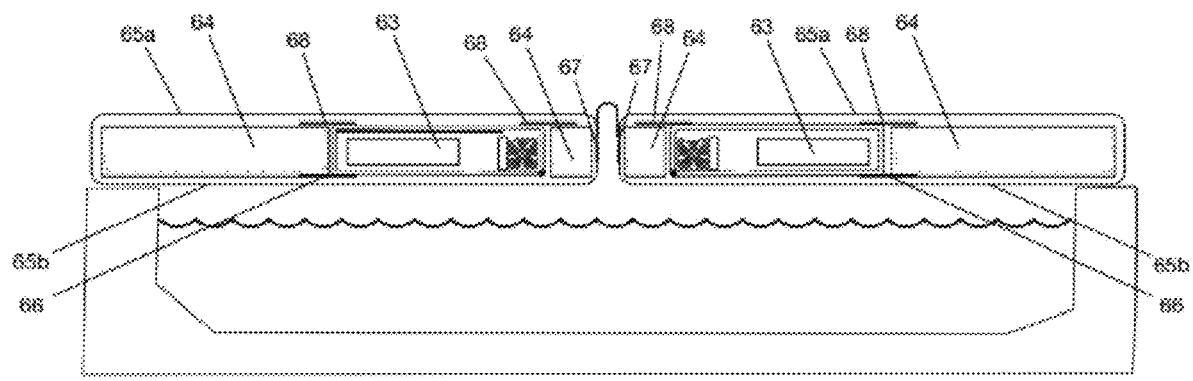
FIG. 9 illustrates an additional form of the system shown in FIG. 2.

In a fifth embodiment of the entire cover assembly, as shown in FIG. 9, the heater 63 can be either the embodiments of the heater FIG. 6 or FIG. 8, but it is mounted in the cover differently. In the assembly of FIG. 7, the heater is inserted into an opening that passes all the way through the cover, so that the top of the heater 21 faces the sky directly, and the bottom of the heater 38 faces the water directly. While this is the most thermally efficient, the appearance of the plastic on the top may be objectionable, and the seam between the heater and the existing cover faces the elements, and must be sealed against leaks, which can be costly. Furthermore, replacement of the heater requires tearing out the seal between the heater and the cover, which can damage the seal and the cover. The embodiment in FIG. 8 has a continuous vinyl cover across the top, which can be more attractive on the outside, and allows the heater to be replaced more easily through the zipper on the side. As previously mentioned, the most common type of spa cover consists of a rigid polystyrene insulation board 64 that is inserted into a vinyl fabric enclosure 65. The fabric enclosure has a zipper 67 on each side that allows the insulation board 64 to be inserted.

In FIG. 9, the two heaters 63 are installed in openings in the rigid foam insulation 64 before the insulation is installed in the vinyl enclosure 65. A flange 68 preferably two inches wide is attached to the heater around some or all of the the perimeter of the top of the heater. The flange 68 is preferably also polycarbonate so that it can be solvent-welded to the heater, which is a very low cost and high strength method of bonding. The heaters are then dropped down in to the openings, and the flange locates the heater in the hole and allows the heater to transfer physical downward forces to the load-bearing insulation. Since the loads on the top of the cover are much larger than the loads on the bottom of the cover, the large flange runs along the top of the cover. Smaller clips 66 are rotated and locked into place to keep the cover from moving upward in the opening during handling. After the heater 63 is installed in the foam insulation 64, the assembly is then inserted into the fabric enclosure 65 through the open zipper 67. In order for the heater to work, the fabric enclosure must be at least partly transparent in the area over the heater. This can be accomplished by making the entire top of the enclosure 65*a* out of transparent vinyl, similar to that used for boat tops and flexible enclosures. This allows most visible light to pass through, but maintains a complete water seal over the heater, so no external water sealing must be done around the perimeter of the heater. Alternatively, the cover could be mostly made of opaque vinyl as is more common, and just the center portion of the cover top would be made clear. In order to maintain color harmony with the rest of the spa, in another embodiment the vinyl can be colored to match the rest of the spa as long as a sufficient transmissivity is maintained. The bottom of the enclosure 65*b* must only transmit infrared energy and not visible light, so it need not be transparent. Radiation from the bottom of the heater can be absorbed and re-radiated from a simple vinyl cover with some loss of temperature and overall efficiency. To improve efficiency, in another embodiment the bottom of the cover 65*b* is made of an open weave fabric which allows the bottom of the heater a direct view of the water which increases the radiant heat transfer efficiency. Alternatively, the bottom of the enclosure 65*b* is adhered to the radiator of the heater, which would improve the radiant heat transfer but would make changing the heater more difficult.

Figure 10:
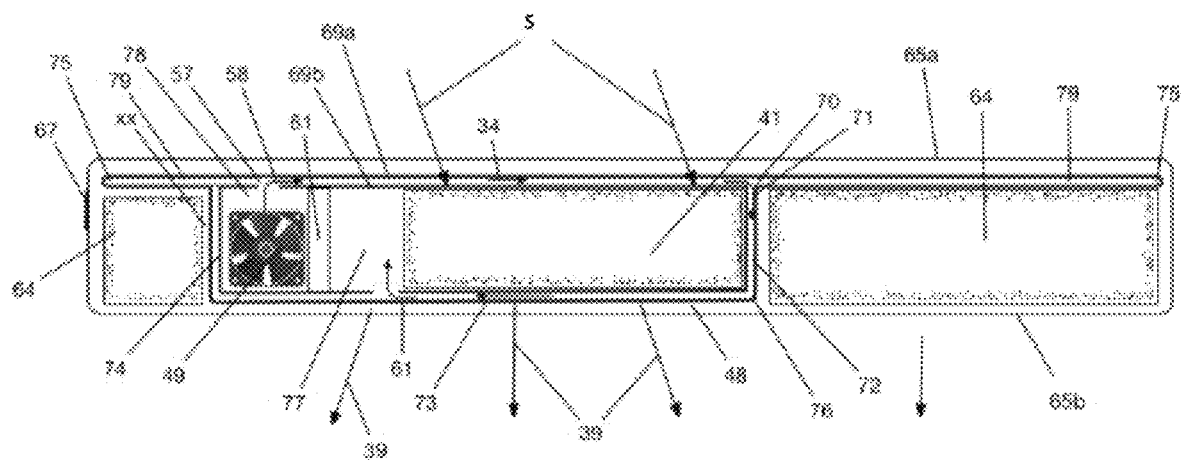
FIG. 10 illustrates an additional form of the system shown in FIG. 2.

A sixth form of the cover assembly is shown in FIG. 10 which shows only one half of the cover. The other half is identical and is connected by a flexible hinge 51 as in FIG. 9. The cover configuration in FIG. 10 presents a single continuous material 69b under the transparent outer cover 65a. The top sheet 69 of the absorber 2 is preferably formed out of one continuous sheet of twinwall which is closed at the edges 75 to prevent air from flowing out. The twinwall of the top sheet 69 has an upper side 69a and a lower side 69b. Two slots 57 and 70 are cut in the underside 69b of the top sheet to allow the passage of air into 58 and out of 71 the sheet. The underside of the sheet 69b in the portion of the sheet that is aspirated with air is colored a relatively dark opaque shade using paint, laminations, or other means to absorb the majority of the sunlight S that passes through the top outer cover 65a and the top face of the twinwall 69a. Flow passages 72, 73, and 74 are created using other sheets of twinwall to allow the air to exit the sheet, flow along the bottom of the cover, and to enter the central cavity 75 which forms the return plenum. These flow passages can preferably be created by making 72, 73, and 74 out of a single sheet of twinwall and cutting slots and folding the sheets as previously described. Alternatively, 72, 73, and 74 can be formed of three separate sheets and joined in a way to allow air to flow through the corner 76. The top edge of 72 is joined to a slot in the bottom side of the upper sheet 69b in a manner that allows air to flow from the upper sheet 69 to the vertical sheet 72. The air then flows along the bottom of the sheet, releasing its heat to the bottom of the sheet which forms the radiator 4 which then transfers the heat to the water below. The barrier 61 separates the return plenum 77 from the supply plenum 78. The fan 49 draws air from the return plenum 77 and pressurizes the supply plenum 78 to force air back into the upper sheet 69 through the slot 57 cut in lower side of the upper sheet. The portion of the upper sheet 69 that has air flowing through it 34 forms the absorber. The remaining portion of the upper sheet 69 that does not have air flowing through it forms a large flange 79 that keeps the heater located on the insulation 64 and transfers vertical loads to the insulation. Functionally, this portion of the upper sheet does not do any heating and so can be of any color. However, the underside 69b of the entire upper sheet can be colored the same color in order to maintain the most consistent visual appearance from above, which is desirable. Coloring the underside (as opposed to the upper side) of the upper cover has the advantage of keeping the colored surface protected and away from potential sources of abrasion and scratches. This allows the coloring agent that colors 69b, be it paint, or a printed lamination, to be less robust and lower cost than if it were on the outside of the cover.

In another embodiment, the entire underside of the cover 69b can be colored with a single pattern, picture, design or sports logo which can provide a distinctive visual appearance that is not possible with vinyl or other standard spa cover materials, as long as the portion of the upper sheet that is aspirated has a relatively dark shade on the average. Also, the heater element can be simply placed in the opening in the insulation, and need not be held in by the clips 66 of FIG. 9. The large flange 79 constrains the vertical movement of the heater in both upward and downward directions. The entire heater assembly can easily be removed and replaced by opening the zipper 67, sliding out the insulation board 64 with the heater installed, then lifting the heater assembly vertically out then lowering a new heater in and inserting the assembly back into the cover and closing the zipper 67. Another embodiment of the cover consists of the outer flexible cover 65 is omitted and the twinwall outer cover 79 is extended to completely envelop the half of the cover.

In another alternate form, the PV panels and controller are deleted from the design, and the fans or pumps are powered directly from the main controller of the spa itself. In this case, the entire heater acts like an auxiliary heater circuit, and the main spa controller preferentially uses the solar heater, and only uses the electrically powered heater when the solar heat is not available. The solar heater works in concert with the existing thermostatically controlled heater. If the desired water temperature is say 100 F plus or minus 3 degrees, then the existing spa electric heater setting would be set to a few degrees below that value, say 97 F, meaning that the electric heater will turn on if the temperature drops below that value. The temperature setpoint of the cover would be a few degrees higher than 100 F, say 103 F. During cloudy or very cold weather, there would not be sufficient solar resource to do any heating, so the electric heater would maintain the temperature at the 97 F setpoint. With sufficient solar resource, the solar heater would raise the water temperature above 97 F so that the electric heater would not turn on. When the water temperature reaches 103, the controller would either slow the fan/pump speed or turn them off so that the water would not be overheated. During a typical overnight period, the spa temperature drops from 3 to 5 degrees so that if the 103 F is reached at the end of the day, the stored heat in the water would carry through the evening until the sun became available the next day. In this way, the temperature range that is acceptable to the user (in this case 6 F) essentially provides free thermal storage that can be used to further reduce the electricity consumption.

Figure 11:
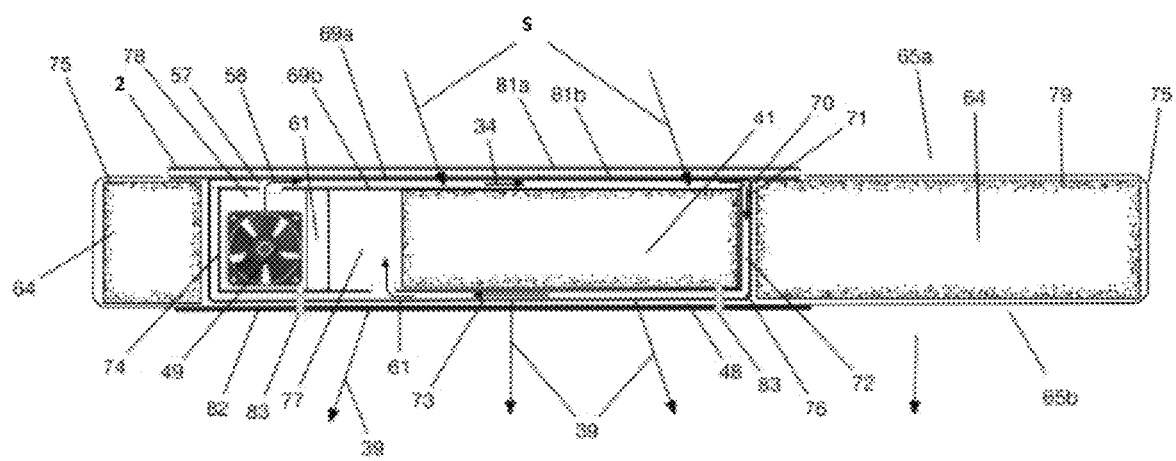
FIG. 11 illustrates a view of a form as shown in FIG. 2.
Figure 14:
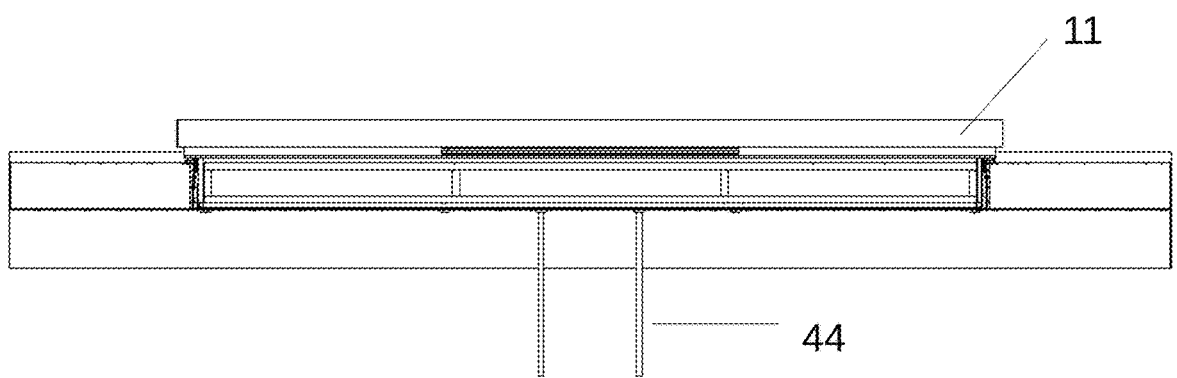
FIG. 14 is a cross-sectional view about lines 14-14 of FIG. 13.

Referring back to the form of the cover assembly as shown in FIGS. 1-4, as well as FIG. 11 through FIG. 17, previously described, and specifically FIG. 11, shows only one half of the cover. The other half is identical and is connected by a flexible hinge 51 as in FIG. 12. FIG. 11 shows a twinwall glazing sheet 2 over the top sheet 69 of the absorber 6. This glazing sheet 2 is connected to the top sheet only around the edges and the fluid passages are not shared in common. The lower surface 81 of the glazing sheet 2 is painted a dark color and so it serves as the surface that absorbs the solar energy S. In order to make a good thermal contact between the bottom of the glazing sheet 81b and the top of the top sheet 69a, the two sheets must be in close contact. In this embodiment, no mechanical or adhesive connection is required across the face of the two sheets to make a good thermal contact. Instead, a curling deflection of the glazing sheet is caused by the difference in the temperature between the top of the sheet 81a and the bottom of the sheet 81b. Since the top 81a is transparent, and the bottom 81b is painted a dark color, the bottom 81b will have a much higher temperature than the top 81a. This will cause the bottom surface 81b to expand relative to the top 81a so that the sheet will to develop an upwards curvature with a center of curvature above the top sheet. However, if the edges are constrained to stay in the same vertical plane as the top sheet 69, the deflection will be very slight and sheet 81 will be pressed down onto sheet 69 with such force as to provide a solid thermal contact. (Testing has shown a temperature drop across the two sheets of less than 3 degrees F.). To further alleviate the condensation problem, the ends of the twinwall are left open to ventilate and evaporate any temporary condensation buildup. One form of lower surface has been previously described. An alternate form of lower surface configuration is shown in FIG. 3 and FIG. 14 whereby the span across the bottom of the heater surface 48 contains horizontal stays 82 that are attached to the bottom sheet with screws 83. The stays serve two purposes. First, they provide a resistive force to the upward movement of the heater relative to the cover, and second, they serve to keep the bottom of the skin 65b close to the bottom sheet to enhance radiation.

Figure 12:
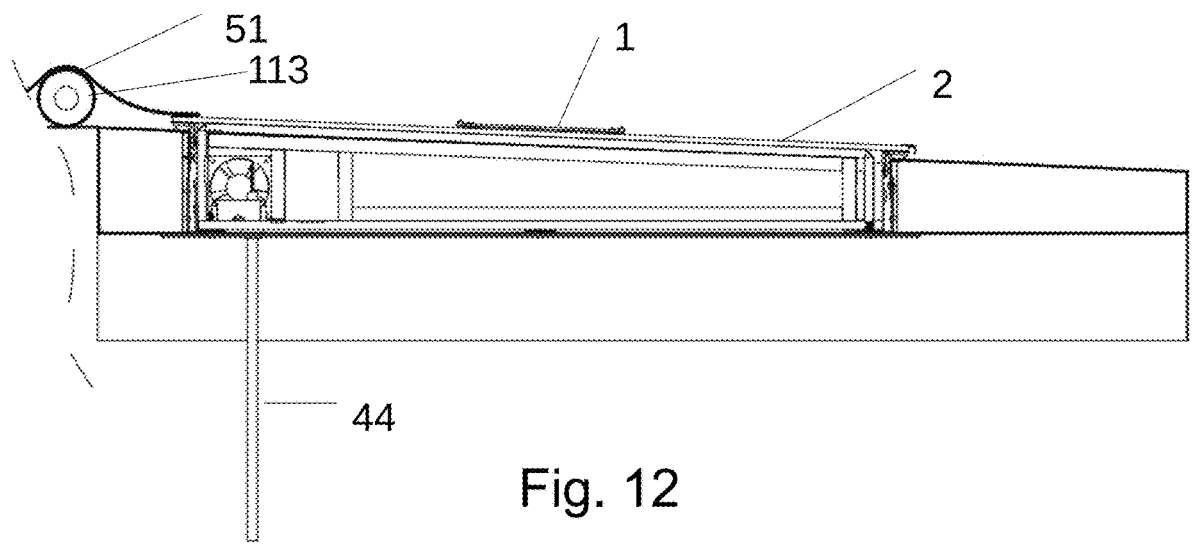
FIG. 12 illustrates an enlarged view of FIG. 11.
Figure 13:
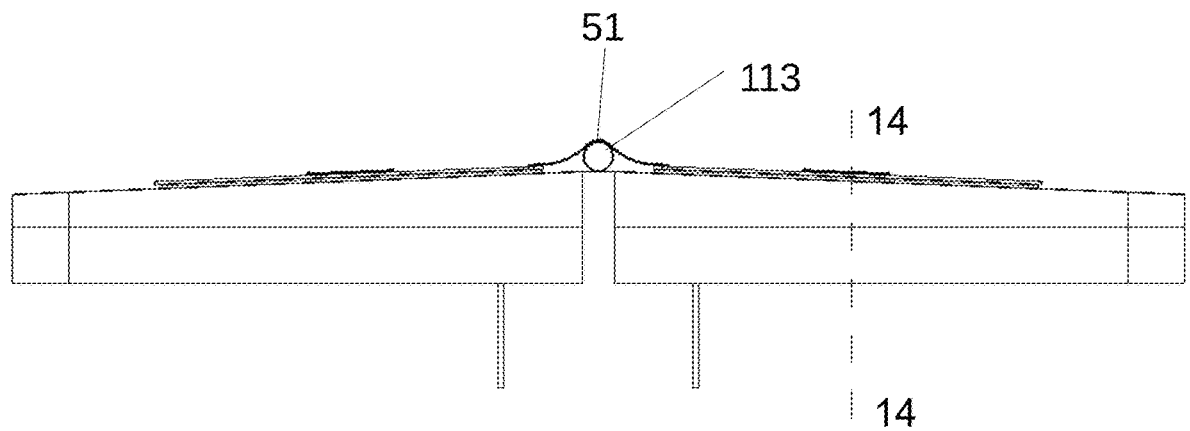
FIG. 13 illustrates a side view of FIG. 12.

FIG. 12 shows a close-up cross section of the top portion of FIG. 11, showing the details of an alternate embodiment of the absorber on the underside of the glazing 2. In the embodiment of FIG. 11, the absorber is a simple dark paint on the lower side 81b of the glazing 2. One disadvantage of using a simple opaque paint as the surface is that the heat is transferred to the air flowing through the sheet 69 is heated on only one side. Heat would be transferred more efficiently if both sides (69a and 69b) were heated. This can be accomplished by splitting the absorbing function between a semi-transparent absorber on the top side of the sheet (69a) and another opaque absorber on the bottom of the sheet (69b). In this way, the sheet is heated on both sides, which increases the effective heat transfer area substantially.

The embodiment of FIG. 12 also demonstrates that if the coating 69a is a clear (transparent) colored paint, and the opaque absorber 69b is a partially reflective neutral color such as grey, the sunlight S will pass through the transparent absorber 69a, and reflect diffusely off surface 69b, then travel back up through the transparent absorber 69b to the observer above. Thus, the transparent absorber 69a is illuminated from below, and it takes on a bright clean appearance. Through selection of the colors of the surfaces 69a and 69b, the appearance of the solar heater can be made to match a wide variety of colors of the main cover.

Another aspect shown in FIG. 12 is the mechanical design which allows the absorber sheet 81 (with its underside coatings 84 and 85) to remain in close physical contact with the top sheet 69 to allow conduction of heat to the air flowing through sheet 69 at low temperature drop. As mentioned above, this is accomplished by making use of the thermal curling deflection of the glazing sheet 81 which causes it to press down on the top sheet 69. In order for this to occur, the glazing sheet must be constrained at at least two of the the edges so as not to allow deflection in the vertical direction (perpendicular to the sheet) but to allow horizontal deflection (in the plane of the sheet). This is accomplished by bracket 86 fabricated out of flexible plastic sheet such as 0.050" thick polycarbonate, which is bonded 88 to the underside of the glazing sheet, and attached to the side of the solar heating element 87. The attach point 89 of the bracket 86 is far enough below the corner of the bracket 86 to allow the bracket 86 to flex and for the attach point 88 on the glazing sheet to deflect horizontally to accommodate thermal expansion of the glazing sheet with no appreciable stress on either of the attach points 88 or 89.

Figure 15:
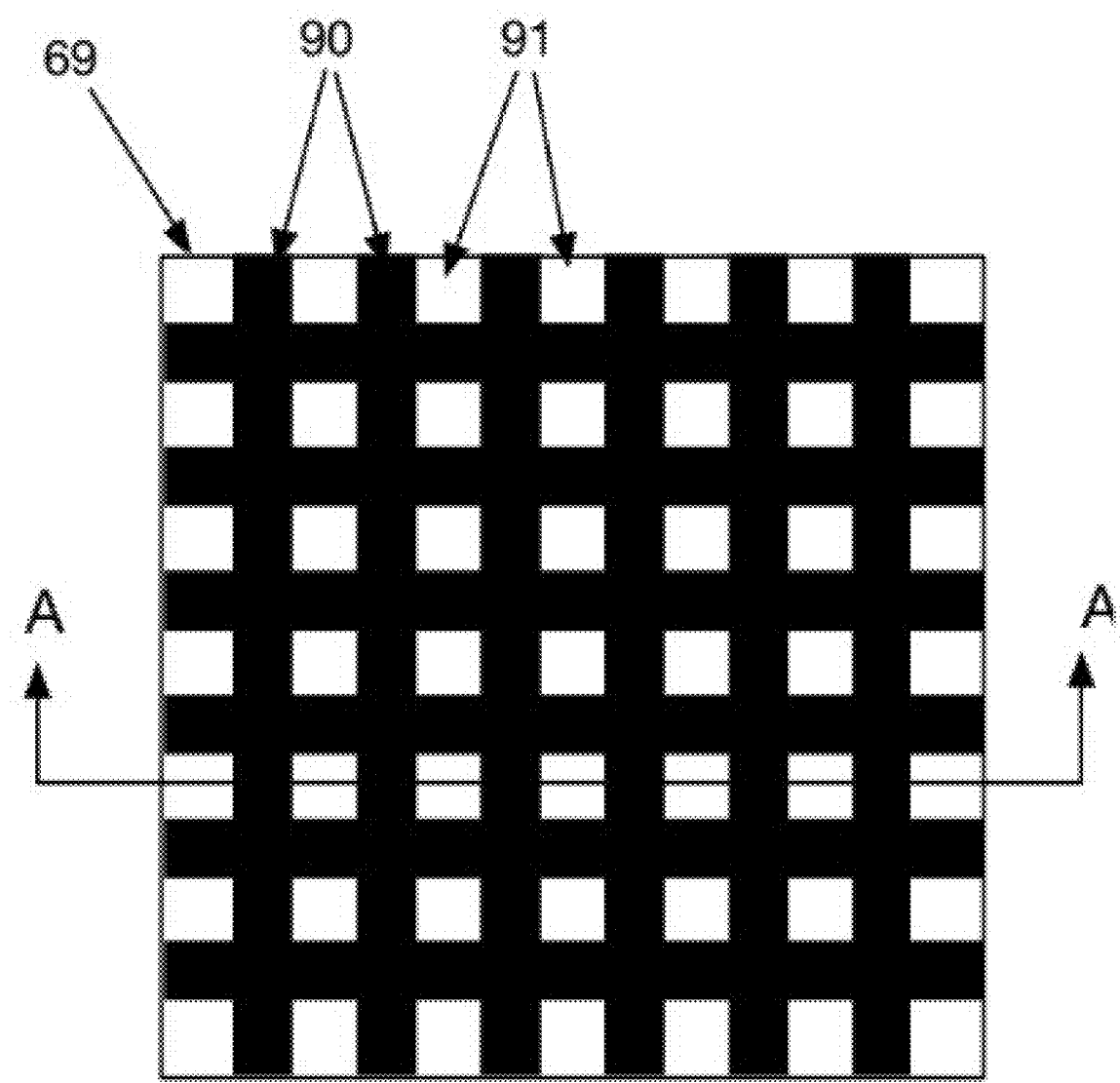
FIG. 15 is a top plan view of the absorber of FIG. 2.
Figure 15A:
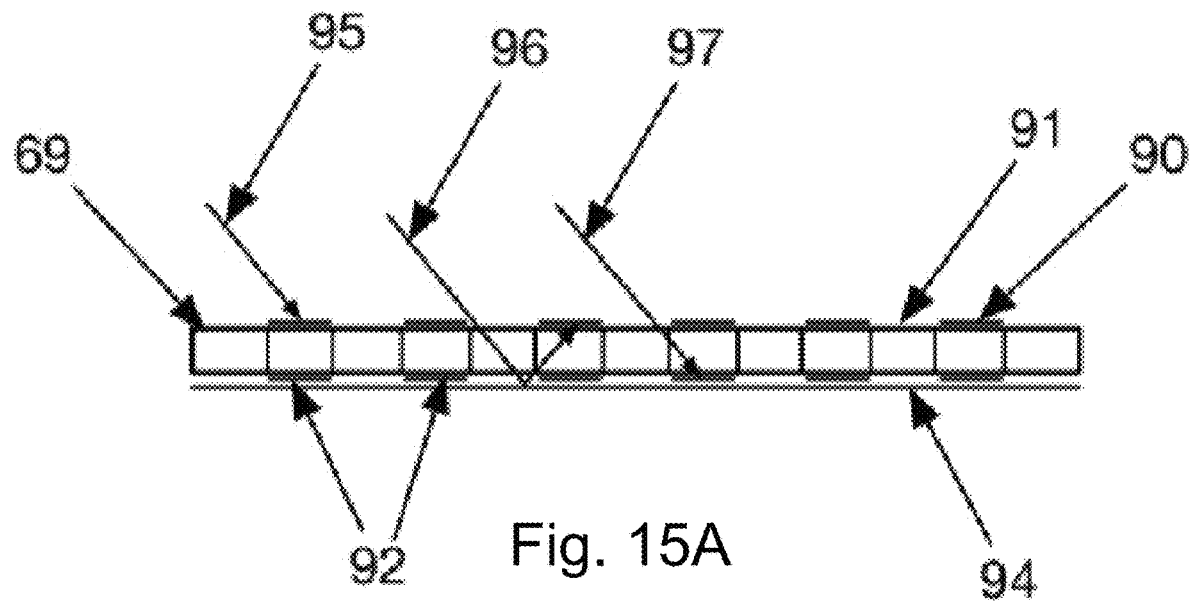
FIG. 15A is a cross-sectional view about lines A-A of FIG. 15.
Figure 15B:
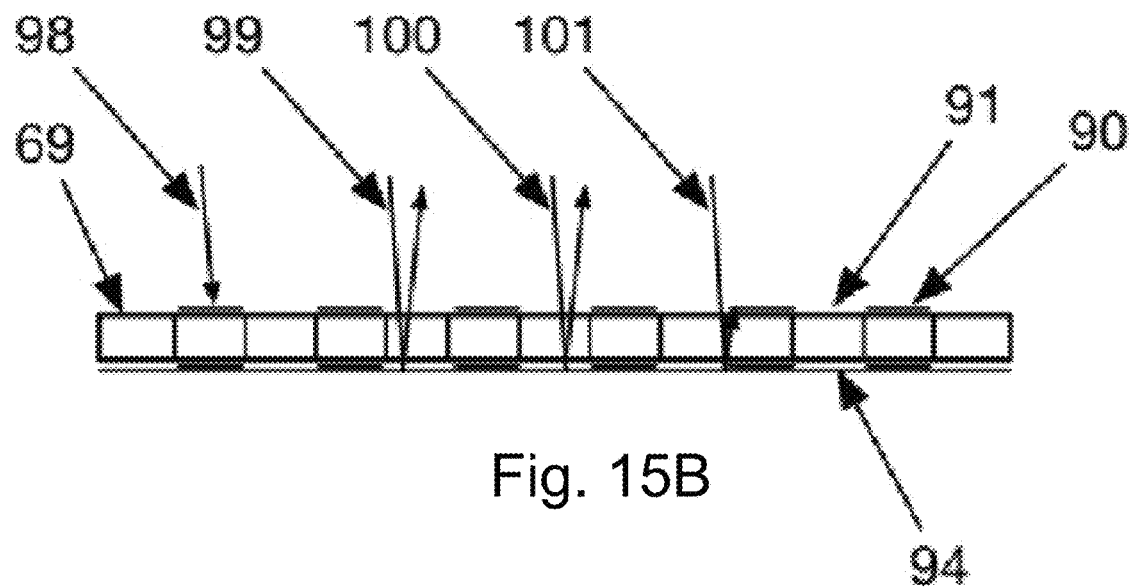
FIG. 15B is a cross-sectional view about lines A-A of FIG. 15.
Figure 16:
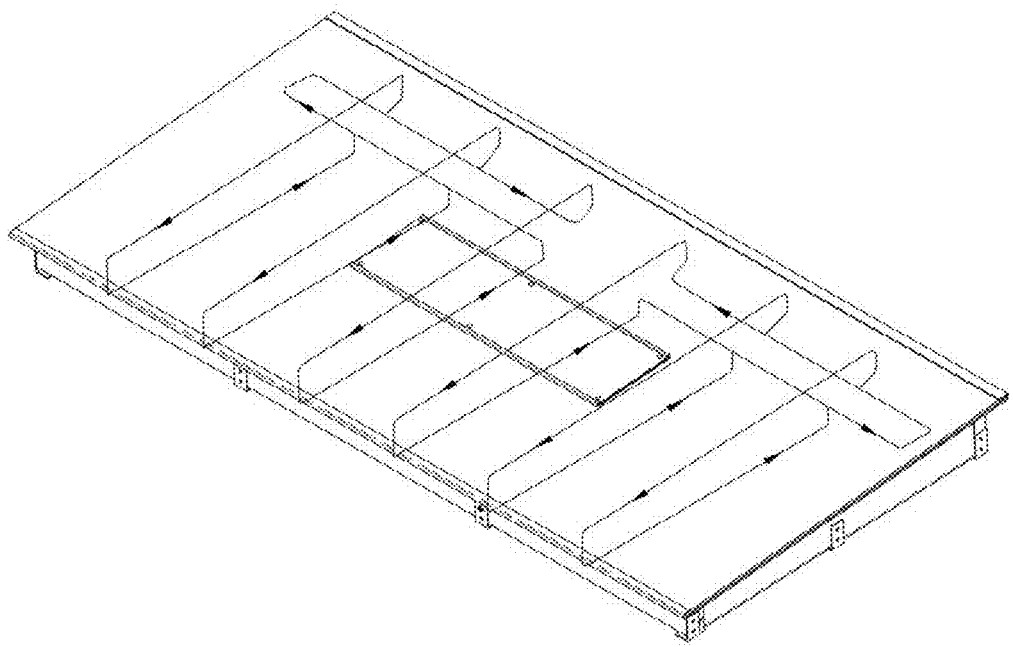
FIG. 16 is a flow diagram.

Different forms of the two-layer absorber is shown in FIGS. 15A and 15B. In FIG. 15A only the top sheet 69 of the absorber 2 from FIG. 4 is shown; all of the other aspects FIG. 4 are retained, with the exception that the glazing 2 is clear and has no absorbing coating applied. FIG. 15 shows a top view of the top sheet 69 of the absorber 2, which is a clear plastic twinwall sheet on which a heat-absorbing coating 90 has been applied which is not continuous but which has a regular pattern of small areas which are left clear to form windows 91 through the clear plastic material. In FIG. 15, the coating is shown as being applied using two arrays of straight lines at orthogonal angles, so that the windows 91 that are formed are square in a regular grid pattern. Other methods which result in different shapes of windows are possible; what is important is that the size of the windows 91 is comparable to the thickness of the top sheet 69. The lower side of this absorber is shown in the section views in FIGS. 15A and 15B. A similar coating 92 is applied to the back of the top sheet 69 that creates windows 93 on the lower side that approximately align vertically with the windows on the upper side 91. Below the lower side of the absorber, a fully reflective sheet or coating 94 is applied so that any light that passes through the lower window 93 will be reflected back towards the upper side of the absorber sheet; whether the reflected sun ray strikes the upper absorber 90 or passes back through the upper window 91 is a function of the angle of the incident sun ray.

These directional layering systems or directional absorbers are advantageous due to use of the sun's angles. The effect of this configuration of coatings is shown in FIGS. 15A and 15B, which show two cross sections of the layered absorber. In the FIG. 15B, the incident angle of the sun rays is typical of a morning, afternoon, or winter period when there is no danger of overheating the absorber and so it is advantageous to absorb all of the incident light. Sun rays 95 that strike the upper absorber are of course absorbed by the upper absorber 90. Sun rays 96 and 97 that pass through the upper window 91 are also absorbed, either by the lower absorber 92 or, after reflection, on the lower side of the upper absorber 90. When the incident angle of the sun is at a higher angle, the incident solar energy per unit area is higher and if the ambient temperature is high the whole absorber can be in danger of overheating and exceeding the temperature limits of the plastic twinwall sheet. When the sun angle is high, sun rays 98 that strike the upper absorber 90 are absorbed so that the majority of the sunlight is collected for use. However, almost all of the sun rays 99 and 100 that pass through the upper window are reflected directly back through the upper window 91 and out of the collector, thus reducing the peak stagnation temperature of both absorbers 90 and 92. Only a small fraction of the sun rays 101 are absorbed either on the lower absorber 92 or the upper absorber 90. The fraction of the sunlight that is reflected at high sun angles can be readily controlled by adjusting the thickness of the lines that form the upper and lower grids. If the thickness of the lines is equal to the spacing between the lines, then to first order about 75% of the light will be absorbed and 25% reflected, which is enough to reduce the stagnation temperature from 300F, which is too high for the polycarbonate plastic, to 260 F, which is within the service temperature of the material.

Tables demonstrating the effect of this directional absorber are shown in Tables 1, 2 and 3. The upper curve in Table 1 shows the amount of sunlight incident per square meter on an absorber on a clear day near the summer solstice, when the angle of the sun is the highest. The top curve corresponds to a plain black absorber and shows an approximation of a half-sine wave peaking at about 1000 W/m2. The lower curve 501 shows the absorbed sunlight if the directional absorber is employed, showing that the incident energy levels off at about 700 W/m2. The fraction of the solar energy in the between the two curves is only about 16 percent of the total incident energy; thus, the damage of overheating can be avoided for a small penalty in the absorbed energy. However, the practical effect of the lost energy is much less, since during the summer months, the spa loses less heat and there is excess energy on many days. In addition, at other times of the year, when there is more need for heat, the fraction of solar lost to the directionally reflective absorber is less than that near the summer solstice. Table 2 shows that the incident flux peaks at about 650 W/m2, and the lost fraction is only 8 percent. During the winter solstice, (Table 3) there is no loss at all due to the low angle of the sun throughout the day. Detailed hourly simulations show that the total annual loss of useful energy due to the directional absorber compared to a theoretical plain black absorber are less than five percent.

The upper windows 91 and the lower windows 93 need not be exactly the same size, nor do they need to be exactly aligned vertically. Indeed, the relative size and orientation of the upper and lower windows can be manipulated to optimize the reflecting effect and to adjust for the angle that the collector is mounted or the climate of the installation. Also, in FIGS. 16A and 16B, the absorbing grid 90 is shown as being aligned with the internal walls of the twin wall; since the walls are transparent, this is not essential to the function of the apparatus. Additionally, the reflecting media 94 can be either specular or diffuse. If the reflector 94 is specular, as would be achieved with an aluminized mylar sheet or other specular reflector, a higher fraction of the light passes through the upper window to achieve a higher cooling effect than if the reflector is diffuse as would be achieved by simply applying a white paint over the absorbing grid. However, specular reflectors are generally higher cost to apply and to maintain their reflective properties, so the lower cost diffuse reflector may be acceptable in some cases. This embodiment maintains the advantage in which both sides of the absorber serve as absorbing surfaces, which reduces the conduction path for heat to travel from the absorbing surfaces to the fluid which passes directly through the absorber 69, and so delivers heat closer to the collection temperature.

In the embodiment discussed above, the controller has knowledge of the history of the temperature of the water using a sensor either in the water or over the water, and the temperature of the radiator using a sensor 55 on the radiator. Then the instantaneous heat transfer from the radiator to the water is calculated based on standard formulas for radiant and convective heat transfer, the temperatures, and the surface areas. In addition, if the temperatures are sampled frequently enough, this power is integrated over time to provide an estimate of the amount of thermal energy the cover has transferred to the water, and an estimate of the electricity and cost savings to the user. This information is then transferred to the user over the wireless interface to a computing or display device so that the user has confidence that the cover is indeed saving electricity and money. A further refinement of the controller would take into effect the time of day, and the variable cost of electricity over the day and through the months. If the controller has wireless capability, it can have knowledge of the day and time, and it can be programmed to have the utility cost structure loaded into memory. The heater can be programmed to preferentially heat the spa using solar during periods of particularly high electricity rates by changing the setpoint of the solar heater to essentially use the water as thermal energy storage so that the total cost of heating the water over the day is reduced because the solar option was used preferentially when rates were high as on summer afternoons and evenings.

The rubber gasket 109 which seals the perimeter of the glazing to the vinyl of the unmodified cover 11 is intended to prevent rain water that falls on the top of the cover from entering the spa. Such water intrusions are unwanted as they can bring pollen and contaminants that promote the growth of algae, and can also cause the spa to take on an excess of water. The gasket 109 is most effective in locations where there is not standing water against the gasket. Along the sections of gasket closest to the hinge, the slope of the taper of the cover is such that rain water will flow towards the gasket and result in standing water against the gasket which can result in the aforementioned leaks. For this reason, a hinge cover 51 (shown in FIG. 1, FIG. 12, FIG. 13 and FIG. 14) is installed which extends the length of the heating elements and spans the space between them. This hinge cover has a lengthwise pocket that contains a soft foam insert 113 such as polyurethane which causes the middle of the hinge cover 51 to rise up above the edges of the glazing so that rain water falling on the cover will be directed to the top of each glazing where it will drain away from the center gaskets. The hinge cover is lightly fastened to the edge of each glazing with hook and loop fasteners or magnetic connectors. Spa covers also typically have mechanical lifting aids which have a round bar that lays across the cover on top of the hinge; the described hinge cover also serves to hide this lifting bar for a more attractive appearance.

It should be understood that the directional absorber has utility beyond the solar spa heater application. Most commercially available flat plate solar thermal collectors are made of aluminum, copper, and glass, and while these collectors are efficient, they have a high weight per unit area and relatively high costs which limit their application considerably. The use of polymer materials for a rooftop solar thermal collector has many advantages in terms of cost and weight, but the use of polymers has been limited due to the low melting temperature of plastics compared to the stagnation temperature of a reasonable efficient collector. The aforementioned polycarbonate directional absorber has the advantages of a polymer collector and importantly also has a passive and reliable means of limiting the peak temperature during stagnation. Such a rooftop polymer collector could use air as the working fluid, as with the spa cover, or use a liquid that is compatible with polycarbonate at high temperatures, such as polydimethyl siloxane (silicone oil) to improve heat transfer rates. Other applicable applications whereby control of the transmission and absorption of sunlight as a function of the angle of incidence is useful include building exterior walls, roofs and windows. In these applications, sunlight can be absorbed by the building when advantageous from a heating and cooling standpoint, and reflected when not.

A further embodiment, as shown in FIGS. 18-23, shows an embodiment having a cover 110 that contains a thermally active module 112 preferably wrapped in a fabric or vinyl skin 111 and joined by a living hinge down the center 113. Visible on the top of the cover are one or more solar PV panels 114 which provide electrical power to the active thermal functions inside the cover in certain embodiments.

Figure 19:
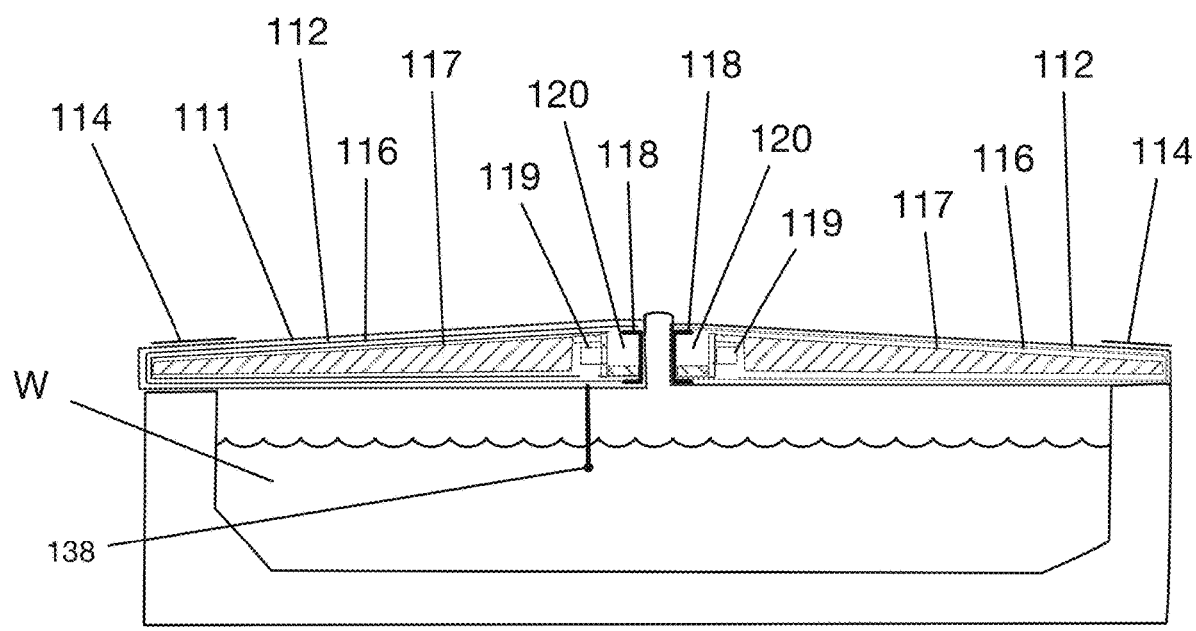
FIG. 19 is a cross-section of FIG. 18 about lines 19-19.
Figure 20:
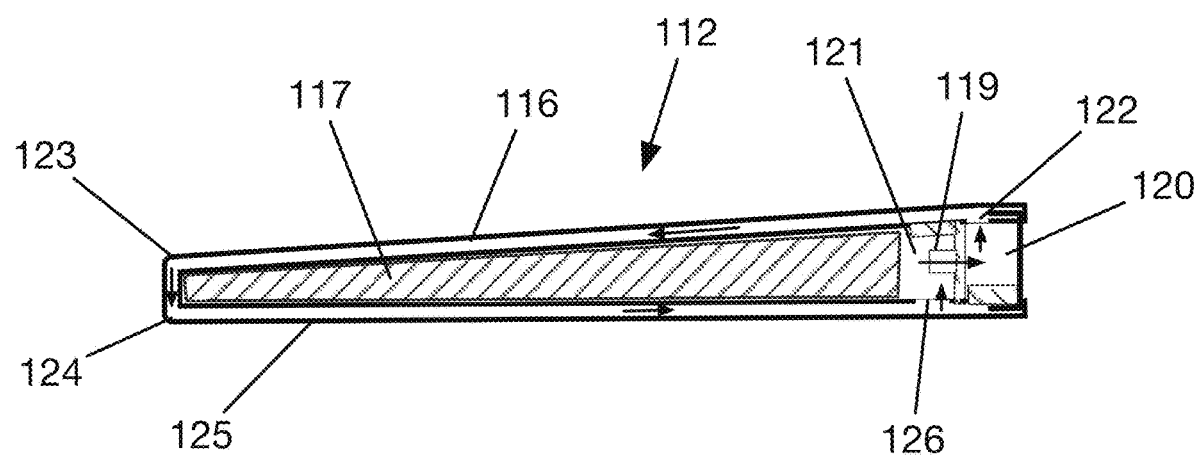
FIG. 20 is an enlarged sectional view of FIG. 19.

FIG. 19 is a cross section of the spa cover 110 mounted on a spa, showing the internal construction of the thermal exchange modules or spa water temperature regulation means 112 with an embodiment showing two of the thermal exchange modules 112. Another embodiment would have only one active thermal exchange module, and the other side would not be thermally active. Each module may be wrapped in a vinyl or fabric skin 111 which provides the desired outer appearance and protects the thermal modules from direct solar ultraviolet radiation which can damage the polycarbonate sheets. Just under the skin 111 is a twinwall plastic shell made up of an upper twinwall sheet and a lower twinwall sheet 125. The internal cells of the twinwall are oriented in the plane of the cross section to allow fluid communication between the upper surface and lower surface of the shell, as shown in FIG. 20. As described above, the twinwall is preferably polycarbonate which has been extruded in the form of twinwall hollow sheets. Multi-wall polycarbonate sheets may be used without departing from the scope. Sheets of extruded twinwall plastic are utilized as thermally active surfaces, in which the working fluid, such as air, flows through the sheet itself. The twinwall plastic is preferably about 6-8 mm thick and it provides a near total seal against moisture intrusion from the top and bottom surfaces. The twinwall configuration of the extruded plastic greatly increases the stiffness of the sheet relative to a solid sheet of the same weight. Further, if polycarbonate is used for the material, the high impact resistance offered by polycarbonate is sufficient to survive large hail stones with no penetration or pock marking.

The twinwall is folded into a shell in such a way as to provide continuous air passages from the shell material on the top of the cover to the material on the bottom of the cover in a manner to be described. The interior of the shell 116, 125 is an insulation module or member 117. This can be formed of various types of closed cell, moisture resistant insulation such as polyisocyanurate, or polyurethane spray foam. Another form of insulation (not shown) includes use of the polycarbonate shell with an interior insulation made up of a layer of rigid foam with metallized mylar used to wrap the foam. This allows the insulation to be formed by thin sheets of rigid foam insulation such as polyisocyanurate which is faced with foil to allow insulating air cavities to be formed. The foil faced sheets provide air cavities that are bounded by reflective surfaces providing significant insulation with very low weight, which is highly desirable for a spa cover.

Figure 21:
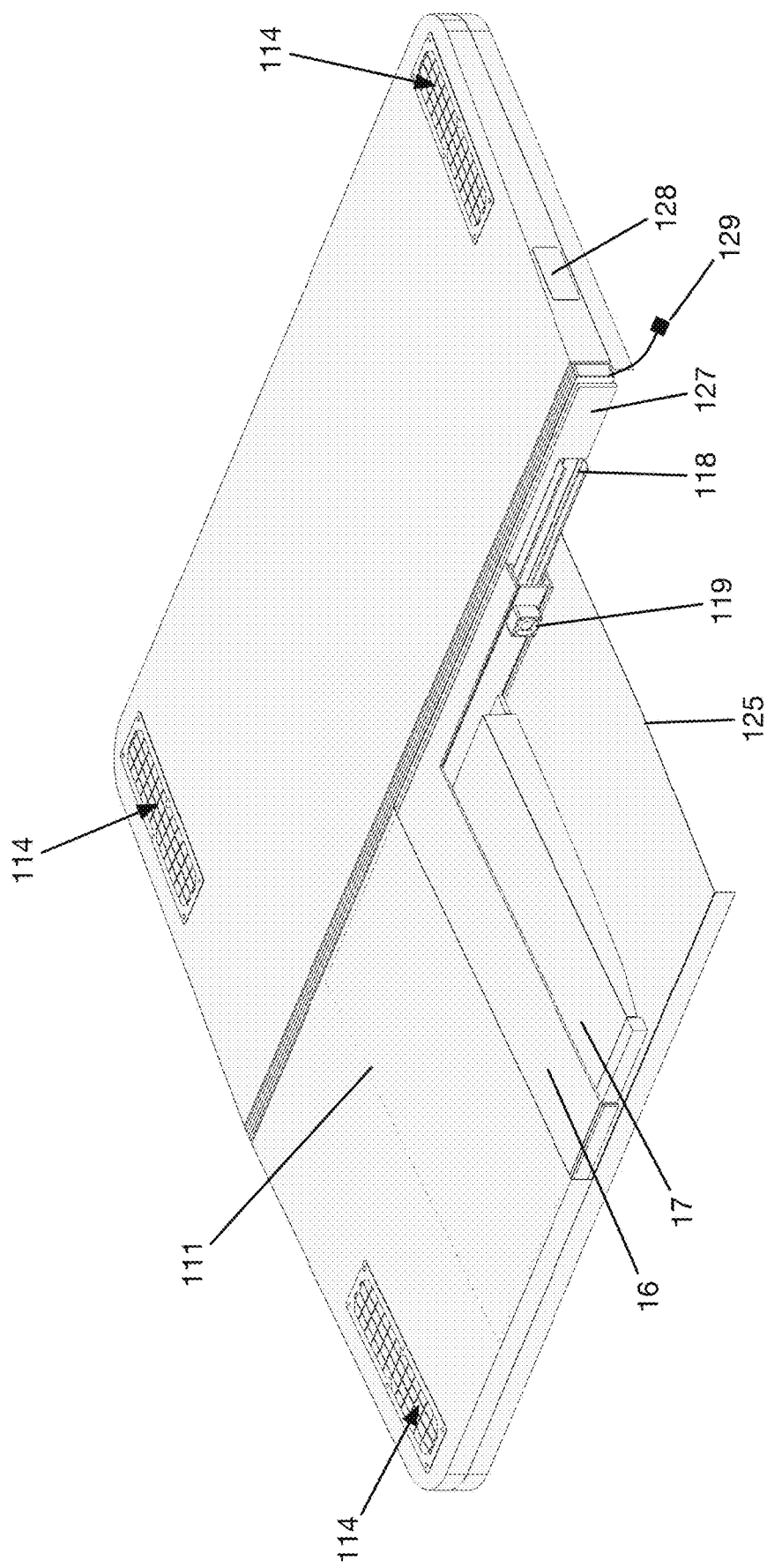
FIG. 21 is a perspective cut away view of FIG. 18.

As shown in FIG. 21, the photovoltaic panels 114 are mounted on the top of the skin and attached by plastic rivets or waterproof adhesive. The panels 114 are capable of converting solar energy to electrical energy and may take any form that allows for conversion of energy. The panels 114 are mounted, preferably using rubber gaskets and away from the hinge so that when the cover is folded, the panels 114 do not strongly rub against each other, which would cause scratching. Also, the diversity of locations of the four solar panels 114 minimizes the chances of all four panels being shadowed at the same time, maintaining the thermal function in the presence of partial shadowing. Each thermal exchange module 112 also has a structural channel 118, preferably made of galvanized steel, which runs the length of the module along the center edge and which provides structural stiffness and strength for the spa cover to withstand the loads due to snow, wind and people or objects on the top of the cover. Finally, one or both of the thermal exchange modules 112 has a fan 119 and air ducts 120 which facilitate the flow of air around the module as detailed below. The airflow allows thermal communication between the water W in the spa and the ambient environment.

FIG. 20 shows a cross section of one of the thermal exchange modules 112. Air is drawn from a return duct 121 through a small fan 119 and into a supply duct 120. The air then enters the twinwall sheet 116 through a slot 122 that is cut through one face of the upper twinwall sheet 116. The air then flows through the twinwall passageways, which are disposed underneath and in thermal communication with the skin 111 of the cover. In solar heating mode, the skin receives solar radiation and heats up, and the heat is conducted to the upper face of the twinwall sheet 116. The air then becomes heated as it passes through the sheet and approaches two 90 degree angle turns 123 and 124 in the twinwall sheet. The air then returns along the lower face of the twinwall sheet 125. In solar heating mode, the air then releases its heat to the spa water W before it passes through a slot 126 in the upper face of the lower sheet of twinwall 125. The air then flows into the return duct 121 and then through the fan 119 to the next cycle. The air flow path is the same for the cooling and snow melting functions, but the heat flow is in the opposite direction due to the reversed temperature gradients. In another embodiment, the fan 119 orientation is reversed and the airflow is in the reverse direction; the system would also function well with this reverse airflow for any of the modes.

FIG. 21 shows another view of the cover 110 and thermal exchange module 112 for more clarity. The insulation module 117 is enveloped by the upper twinwall sheet 116 and the lower twinwall sheet 125. A fan 119 is mounted on the wall of the supply duct 120, and the structural channel 118 is embedded in the supply duct. The fan 119 is preferably an axial fan which is located at the interface between the return duct 121 and the supply duct 120. The channel 118 is structurally attached to the top twinwall sheet 116 by mechanical fasteners such as rivets or screws to efficiently pass the loads from the top of the cover to the stiffening channel 118. Just next to the middle edge of the thermal exchange module 112 is a thick gasket sheet 127 which can be made of a foam plastic such as polyethylene or polyurethane. This gasket 127 fills the void between the two heater halves to improve the insulating value of the cover assembly 110. The gasket also fills the loose space under the skin 111 so that the skin remains tight across the top and bottom of the cover to improve heat transfer to the water W and the environment. Also visible in FIG. 21 is a view port 128 which allows the user to view a user interface for the electrical controls. As an alternative to power from the solar panels 114, an external power adapter 129 is capable of being connected to power from either main power through an adapter, or being connected to power from the spa itself. This is useful either as a lower cost alternative to the solar panels 114, or as the primary means of power for night time cooling or snow melting functions as described below.

The present form is capable of being operated in at least three modes to exchange heat with the environment. The first is solar heating of the spa water W. When the upper twinwall sheet 116 is heated by the sun to a temperature above the spa water, for example, 200° Fahrenheit, and the spa water temperature is below the desired temperature as sensed by the controller 138, the fans 119 can be operated to cause air to flow in a loop through the top and bottom surfaces of the thermal exchange module 112. This creates thermal communication between the solar heated upper twin wall 116 and the lower twinwall 125 to radiate the heat down to the water. The second is spa night time cooling where excess heat is a problem in many climates. If the spa water W is above the user-desired temperature, and the upper twinwall 116 is below the water temperature, one or more fans 119 can be operated on external power to provide cooling to the spa water W in the reverse of the previous solar heating mode. The third mode is for the elimination of snow or ice on the cover. If snow has accumulated on the cover, the fans can be operated on external power to bring heat from the water in the spa to the outer skin 111 to melt the snow or ice. The fans will generally run on cycles with the fans being automatically or manually shut off when the temperature of the upper twinwall reaches a certain temperature and the snow has melted.

Figure 22:
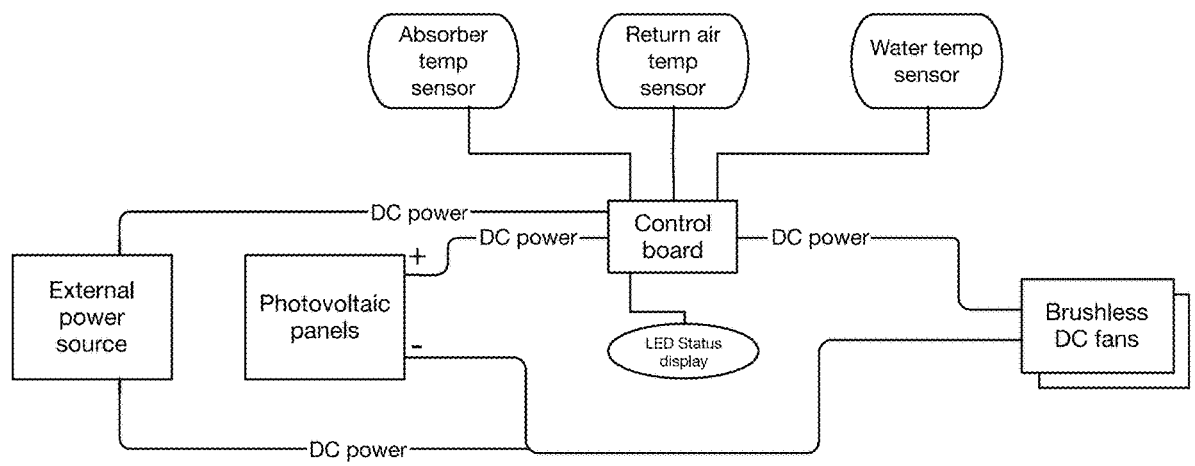
FIG. 22 is an electrical block diagram of the thermal exchange module.
Figure 23:
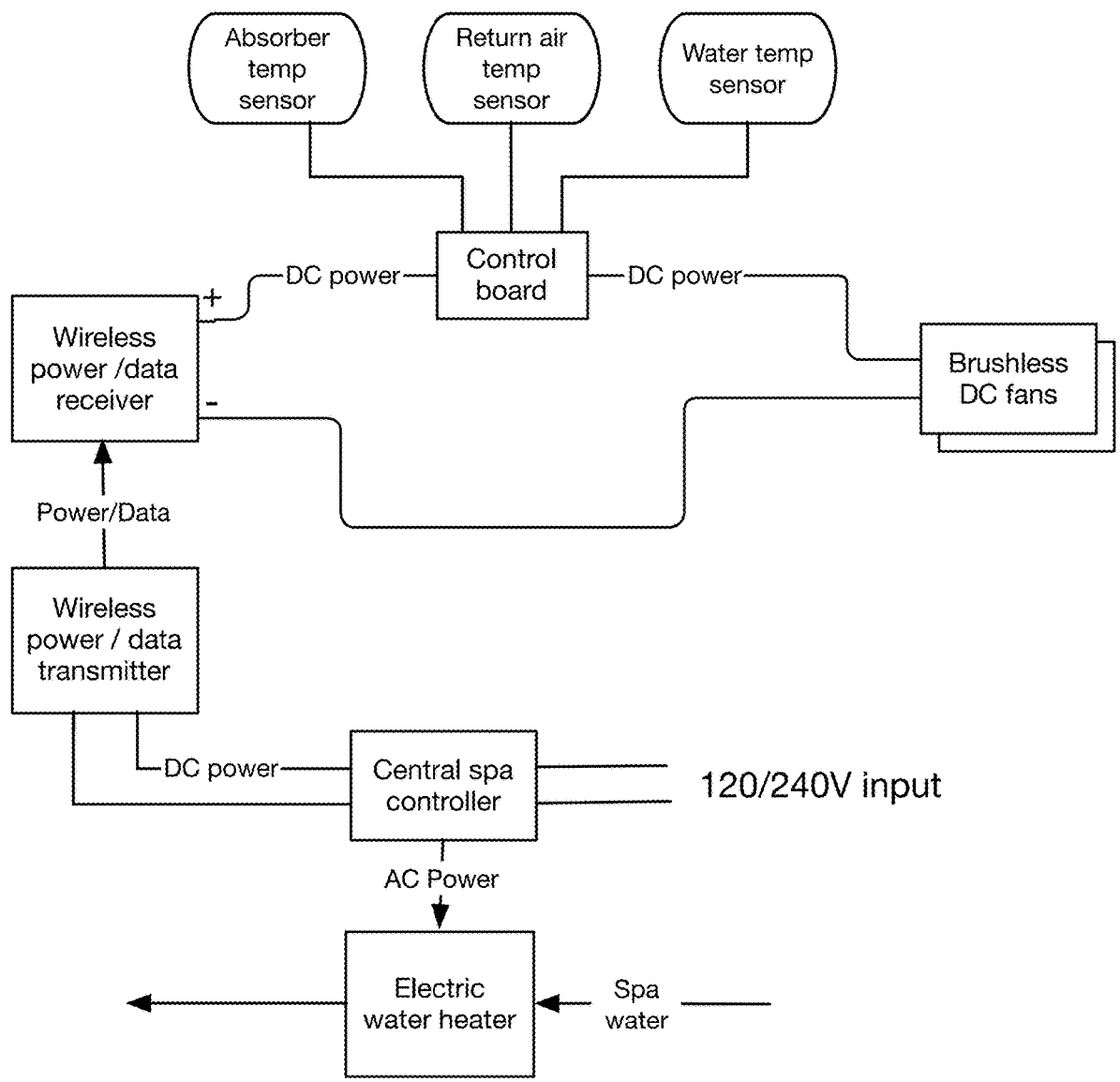
FIG. 23 is an alternate electrical block diagram showing electrical and data connections to the spa controller.

The control schematics to support these operations are shown in FIG. 22 and FIG. 23. In FIG. 22, the controls and the fans are powered by a small PV panel 114 or optionally an external DC power source 129 in parallel through blocking diodes. The control logic and power conditioning are provided by a small printed circuit board mounted in the side of the cover and visible through a window 128 in the skin. This control scheme allows autonomous operation for solar heating, and allows the water cooling and snow melting functions to be performed when the external power is connected. There are three temperature sensors: one for the absorber/upper twinwall 135, one for the air in the return duct 136, and one for the spa water temperature 138. For solar heating, when the absorber sensor 135 detects a temperature that is greater than the water temperature sensor 138 reading, and the water temperature sensor 135 reading is below the desired spa water temperature, the fans 119 are operated to effectuate solar heating. For snow melting, the absorber sensor 135 temperature reading is used to estimate the presence of snow to operate the fans. If snow is present on the skin 111 of the upper twinwall 116, the absorber temperature will remain close to the freezing point of water (32 F) even if the outdoor temperature is far above or below freezing. This is due to the insulating effect of the layer of snow which isolates the upper twinwall 116 temperature from the ambient air, and the isothermal nature of the phase change from ice or snow to liquid water. Therefore if the twinwall temperature is close to the freezing point of water (32 F), the fans are operated on a timer of once per hour to clear the snow from the cover. If the ambient temperature is close to 32 F but no snow is present on the cover, and the fans run, the warm air supply quickly drives up the upper twinwall temperature, signaling the controller to end the melt cycle. In this way the spa water heat can be used to efficiently melt the snow from the cover with a minimum of excess energy usage.

An alternate embodiment of the control scheme is shown in FIG. 23, in which the central spa controller provides control signals and optionally power to the spa cover via a wireless power transfer device or wireless data link. An electronic control board mounted in the cover receives signals and optionally power from the central spa pack via wireless links that the water temperature is below the setpoint and so the fans should be operated.

While the present device and alternate forms have been described in connection with the illustrated embodiments, it will be appreciated and understood that modifications may be made without departing, from the true spirit and scope.

We claim:

1. Solar thermal exchange system for a pool or spa, comprising:
   a self-contained heat exchange spa cover having thermal means for regulating spa water temperature;
   said thermal means having an outer sealed, double-layered twinwall shell with input and out members and an inner insulative material;
   an outer skin layer encasing said cover and in direct communication with said shell;
   solar conversion panels secured to an exterior surface of said outer skin layer;
   at least one fan secured within said cover; and
   at least one sensor associated with said cover.

2. The exchange system as set forth in claim 1 wherein said thermal means is adapted to provide conductive and convective energy.

3. The exchange system according to claim 1 wherein said twinwall shell has upper and lower sheets that are in continuous fluid communication with each other.

4. The exchange system according to claim 3 wherein said sheets provide continuous air passages from said upper sheet to said lower sheet.

5. The exchange system according to claim 1 wherein said at least one fan facilitates heat exchange between said shell and the environment.

6. The exchange system according to claim 3 wherein said insulative material is interposed between said upper and lower sheets and includes mylar and foam board.

7. The exchange system according to claim 1 including an external power source.

8. The exchange system according to claim 1 including wired or wireless linking to a main control unit.

9. The exchange system of claim 1 including a second thermal exchange module separated from said thermal means by a metal support.

10. The exchange system of claim 1 wherein the direction of heat flow within the exchange system is reversible.

11. A solar conductive spa cover having a thermal collection unit for heating and cooling surfaces, comprising:
    a self-contained solar collecting and radiant heat dispersion unit contained within a spa cover;
    said unit comprising a twinwall shell having an insulated interior member;
    said twinwall having multi-layers of sheets containing spaced channels separated by wall members therebetween;
    said twinwall shell having upper and lower sheet members having a continuous fluid connection and having said insulated interior member interposed between said sheet members; and
    said shell being fully encased within a skin member.

12. The spa cover according to claim 11 wherein said spa cover includes at least one integrated solar collector panel.

13. The spa cover according to claim 11 wherein said spa cover includes at least one fan and at least one sensor.

14. The spa cover according to claim 11 wherein said spa cover includes a temperature probe.

15. The spa cover according to claim 11 wherein said twinwall shell includes input and output ducts and a controller member.

16. A solar thermal device for a spa cover, comprising:
    a spa cover;
    an upper absorber member defined by a twinwall polycarbonate sheet contained within said spa cover;
    a lower absorber member defined by a twinwall polycarbonate sheet contained within said spa cover, said twinwall sheets forming fluid passageways in continuous fluid communication with one another;
    said twinwall sheets having an insulative member therebetween;
    at least one solar collection member secured to said spa cover and providing electrical power to said solar thermal device; and
    said solar thermal device including at least one fan for transmitting fluid between said upper and lower members.

17. The solar thermal device according to claim 16 wherein said fluid passageways are defined by parallel grooves cut across said passageways and forming continuous ducts throughout said twinwall sheets.

18. The solar thermal device according to claim 16 wherein an external power adaptor is linked to said spa cover.

19. The solar thermal device according to claim 16 wherein said solar thermal device includes a control member linking said at least one fan, said solar collection member and at least one sensor.

* * * * *

UNITED STATES PATENT AND TRADEMARK OFFICE
CERTIFICATE OF CORRECTION

| | |
|---|---|
| PATENT NO. | : 11,561,026 B1 |
| APPLICATION NO. | : 16/197089 |
| DATED | : January 24, 2023 |
| INVENTOR(S) | : John Joseph Tandler and Christopher Michael Pearson |

It is certified that error appears in the above-identified patent and that said Letters Patent is hereby corrected as shown below:

In the Specification

Figure 24:
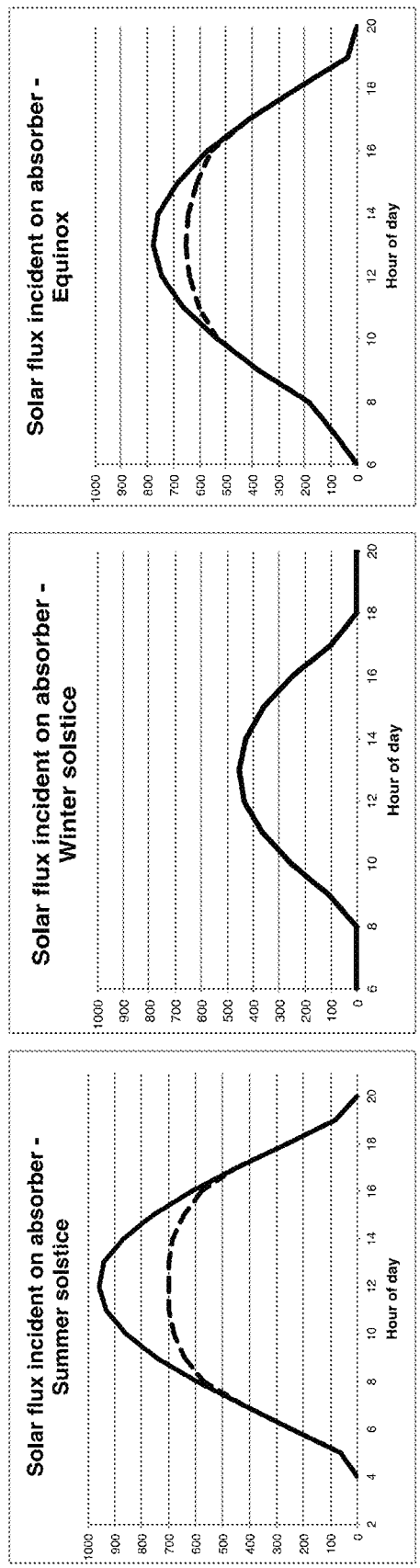

In Column 5, Line 2, "; and Fig. 24 contains Tables 1, 2 and 3 demonstrating the effect of this directional absorber." should be added after the word controller.

In Column 16, Line 45, the words "as shown in Fig. 24" should be added after the number 3.

Signed and Sealed this
Eleventh Day of April, 2023

Katherine Kelly Vidal
*Director of the United States Patent and Trademark Office*